United States Patent
Mizusawa

(10) Patent No.: US 11,190,251 B2
(45) Date of Patent: *Nov. 30, 2021

(54) COMMUNICATION APPARATUS, COMMUNICATION METHOD, AND PROGRAM

(71) Applicant: Sony Corporation, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,779

(22) Filed: May 21, 2020

(65) Prior Publication Data

US 2020/0287605 A1    Sep. 10, 2020

Related U.S. Application Data

(63) Continuation of application No. 16/086,334, filed as application No. PCT/JP2017/005218 on Feb. 14, 2017, now Pat. No. 10,693,542.

(30) Foreign Application Priority Data

Mar. 30, 2016   (JP) .............................. JP2016-067969

(51) Int. Cl.
*H04B 7/02*        (2018.01)
*H04B 7/06*        (2006.01)
(Continued)

(52) U.S. Cl.
CPC ............. *H04B 7/0617* (2013.01); *H04B 7/04* (2013.01); *H04B 7/0626* (2013.01); *H04L 27/26* (2013.01);
(Continued)

(58) Field of Classification Search
CPC ...... H04B 7/0617; H04B 7/04; H04B 7/0626; H04B 7/0456; H04L 27/26; H04W 16/28; H04W 24/10; H04W 72/04
(Continued)

(56) References Cited

U.S. PATENT DOCUMENTS 9,014,025 B2 * 4/2015 Oteri ..................... H04W 24/10
                                                              370/252
9,860,027 B2    1/2018 Christoffersson et al.
(Continued)

FOREIGN PATENT DOCUMENTS

EP    2 773 051 A2    9/2014
EP    2 981 141 A1    2/2016
(Continued)

OTHER PUBLICATIONS

ITL, "UE specific precoded CSI-RS for FD MIMO," 3GPP TSG RAN WG1 Meeting #82, R1-154546, Beijing, China, Aug. 24-28, 2015, pp. 1-3.*
(Continued)

*Primary Examiner* — Helene E Tayong
(74) *Attorney, Agent, or Firm* — Xsensus LLP

(57) ABSTRACT

A communication apparatus includes a control unit configured to measure a terminal-specific reference signal transmitted in a radio resource allocated for each terminal apparatus in units of the radio resource and transmits information indicating a measurement result.

24 Claims, 23 Drawing Sheets

(51) Int. Cl.
*H04W 72/04* (2009.01)
*H04W 16/28* (2009.01)
*H04B 7/04* (2017.01)
*H04W 24/10* (2009.01)
*H04L 27/26* (2006.01)
*H04B 7/0456* (2017.01)

(52) U.S. Cl.
CPC ........... *H04W 16/28* (2013.01); *H04W 24/10* (2013.01); *H04W 72/04* (2013.01); *H04B 7/0456* (2013.01)

(58) Field of Classification Search
USPC ........................................................ 375/267
See application file for complete search history.

(56) References Cited

U.S. PATENT DOCUMENTS

| | | | |
|---|---|---|---|
| 2012/0082052 | A1 | 4/2012 | Oteri et al. |
| 2014/0241274 | A1* | 8/2014 | Lee .................. H04L 5/0048 370/329 |
| 2015/0124673 | A1* | 5/2015 | Ouchi ................ H04W 52/362 370/311 |
| 2015/0180632 | A1* | 6/2015 | Kishiyama ............ H04W 52/04 370/252 |
| 2015/0289208 | A1 | 10/2015 | Liu et al. |
| 2016/0006549 | A1* | 1/2016 | Kim .................. H04B 17/318 370/252 |
| 2018/0084502 | A1 | 3/2018 | Choi et al. |
| 2018/0270692 | A1* | 9/2018 | Yoon .................. H04L 1/0026 |

FOREIGN PATENT DOCUMENTS

| | | |
|---|---|---|
| JP | 2009-49540 A | 3/2009 |
| JP | 2014-027430 A | 2/2014 |
| WO | 2014/157867 A1 | 10/2014 |
| WO | 2014157867 * | 10/2014 |
| WO | 2015/045696 A1 | 4/2015 |
| WO | 2015/068602 A1 | 5/2015 |
| WO | 2015/107942 A1 | 7/2015 |

OTHER PUBLICATIONS

Extended Search Report issued in European Application 17773747.5-1220 dated Feb. 12, 2019.
Ericsson, "Corrections in measurement accuracy requirements for LAA," 3GPP TSG-RAN WG4 Meeting #78, R4-161004, Malta, MT, Feb. 15-19, 2016, pp. 1-6.
ITRI—Industrial Technology Research Institute, "An overview of New 3GPP RAN1 Features and FD-MIMO Technologies for LTE," Copyright 2015, Oct. 4, 2015, pp. 1-62.
LG Electronics, "Beamformed CSI-RS related enhancements based on the identified approaches," 3GPP TSG RAN WG1 Meeting #82, R1-154274, Beijing, China, Aug. 24-28, 2015, pp. 1-7.
LG Electronics, "Discussion on Control Signaling for Uplink Transmission Mode," 3GPP TSG RAN WG1 Meeting £62, R1-104770, Madrid, Spain, Aug. 23-28, 2010, pp. 1-6.
Qualcomm Incorporated, "CSI feedback performance requirements for EB/FD-MIMO," 3GPP TSG-RAN WG4 #78, R4-160044, Malta, Feb. 15-19, 2016, pp. 1-10.
Samsung, "UE capability for FD-MIMO CSI reporting and related procedures," 3GPP TSG RAN WG1 Meeting #82, R1-155478, Malmo, Sweden, Oct. 5-Oct. 10, 2015, pp. 1-3.
Japanese Office Action dated Oct. 20, 2020, in corresponding Japanese Patent Application No. 2016-067969.

* cited by examiner

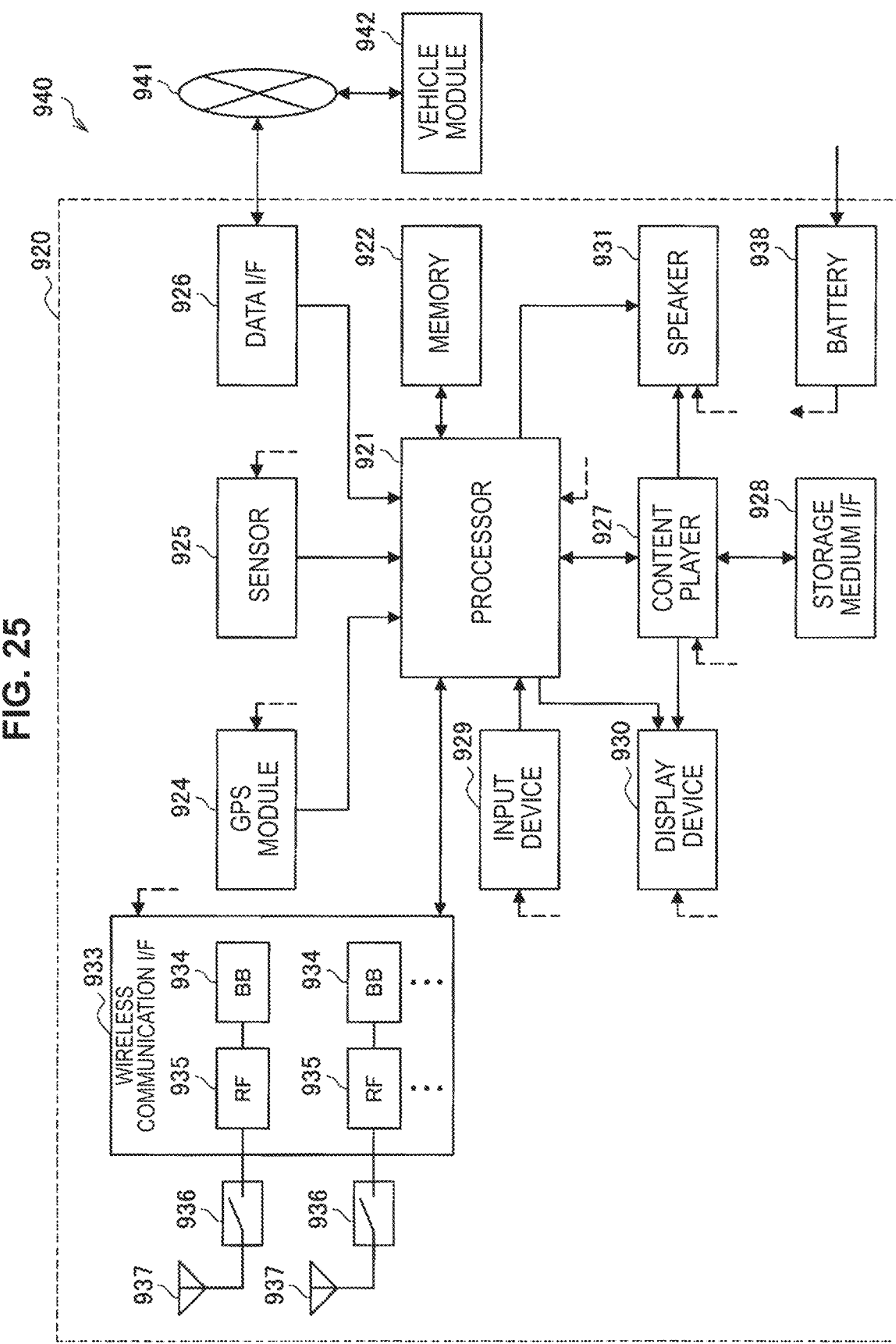

COMMUNICATION APPARATUS, COMMUNICATION METHOD, AND PROGRAM

CROSS-REFERENCE TO RELATED APPLICATIONS

The present application is a continuation of U.S. application Ser. No. 16/086,334, filed Sep. 19, 2018, which is based on PCT filing PCT/JP2017/005218, filed Feb. 14, 2017, which claims priority to JP 2016-067969, filed Mar. 30, 2016, the entire contents of each are incorporated herein by reference.

TECHNICAL FIELD

The present disclosure relates to a communication apparatus, a communication method, and a program.

BACKGROUND ART

To address recent rapid increase in traffic, it is urgent that wireless access capabilities are improved. To realize a high-speed and large-capacity wireless access network, it is studied to arrange a macro cell in which a relatively low frequency of an ultra-high frequency (UHF) band is used and a small cell in which a relatively high frequency is used in an overlay manner. Further, in a small cell in which a high frequency band is used, it is studied to utilize full-dimension multiple-input and multiple-output (FD-MIMO) which compensates for a large propagation loss.

For example, a transmitting apparatus can transmit a sharp beam in accordance with a location of a receiving apparatus by using an array antenna in which a number of antenna elements are two-dimensionally arranged. In order to form an appropriate beam in accordance with a location, for example, a technology of transmitting a reference signal and feeding back a measurement result has been developed.

For example, the following Patent Literature 1 discloses a technology in which an eNB transmits a UE-specific demodulation reference signal (DM-RS) to the UE in a radio resource domain for downlink data signals, and the UE measures channel quality information on the basis of the DM-RS and reports the channel quality information to the eNB.

Further, the following Non-Patent Literature 1 discloses a UE-specific CSI-RS.

CITATION LIST

Patent Literature

Patent Literature 1: JP 2014-027430A

Non-Patent Literature

Non-Patent Literature 1: Industrial Technology Research Institute, "An overview of New 3GPP RAN1 Features and FD-MIMO Technologies for LTE", Oct. 4, 2015, [Retrieved on Mar. 15, 2016], the Internet <http://3gpptrend.cm.nctu.edu.tw/20151004/1.%20%5b3GPP%20LTE-A%E6%A8%99%E6%BA%96%E5%88%B6%E5%AE%9A%E8%88%875G%E9%80%B2%E5%B1%95%E8%AA%AA%E6%98%8E%E6%9C%83%5d%202015100 4%20Rel_13_RAN1_FD-MIMO%20(%E6%95%99%E6%9D%90%E7%89%88)_%E9%83%AD%E7% A7%89%E8%A1%A1%E5%8D%9A%E5%A3%AB.pdf>

DISCLOSURE OF INVENTION

Technical Problem

The technologies proposed in the above-described Patent Literature 1 and Non-Patent Literature 1 are far from sufficient as a technology for utilizing FD-MIMO. For example, the technologies are insufficient in efficiency of processing of transmitting a reference signal and feeding back a measurement result.

Solution to Problem

According to the present disclosure, there is provided a communication apparatus including: a control unit configured to measure a terminal-specific reference signal transmitted in a radio resource allocated for each terminal apparatus in units of the radio resource and transmits information indicating a measurement result.

In addition, according to the present disclosure, there is provided a communication apparatus including a control unit configured to transmit information indicating an operation mode for causing a terminal apparatus to measure a terminal-specific reference signal transmitted in a radio resource allocated for each terminal apparatus in units of the radio resource and transmit information indicating a measurement result.

In addition, according to the present disclosure, there is provided a communication method including measuring a terminal-specific reference signal transmitted in a radio resource allocated for each terminal apparatus in units of the radio resource and transmitting information indicating a measurement result by a processor.

In addition, according to the present disclosure, there is provided a communication method including transmitting, by a processor, information indicating an operation mode for causing a terminal apparatus to measure a terminal-specific reference signal transmitted in a radio resource allocated for each terminal apparatus in units of the radio resource and transmit information indicating a measurement result.

In addition, according to the present disclosure, there is provided a program for causing a computer to function as a control unit configured to measure a terminal-specific reference signal transmitted in a radio resource allocated for each terminal apparatus in units of the radio resource and transmit information indicating a measurement result.

In addition, according to the present disclosure, there is provided a program for causing a computer to function as a control unit configured to transmit information indicating an operation mode for causing a terminal apparatus to measure a terminal-specific reference signal transmitted in a radio resource allocated for each terminal apparatus in units of the radio resource and transmit information indicating a measurement result.

Advantageous Effects of Invention

As described above, according to the present disclosure, it is possible to make processing of transmitting a reference signal and feeding back a measurement result more efficient. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 25 is a block diagram illustrating an example of a schematic configuration of a car navigation apparatus.

MODE(S) FOR CARRYING OUT THE INVENTION

Figure 1:
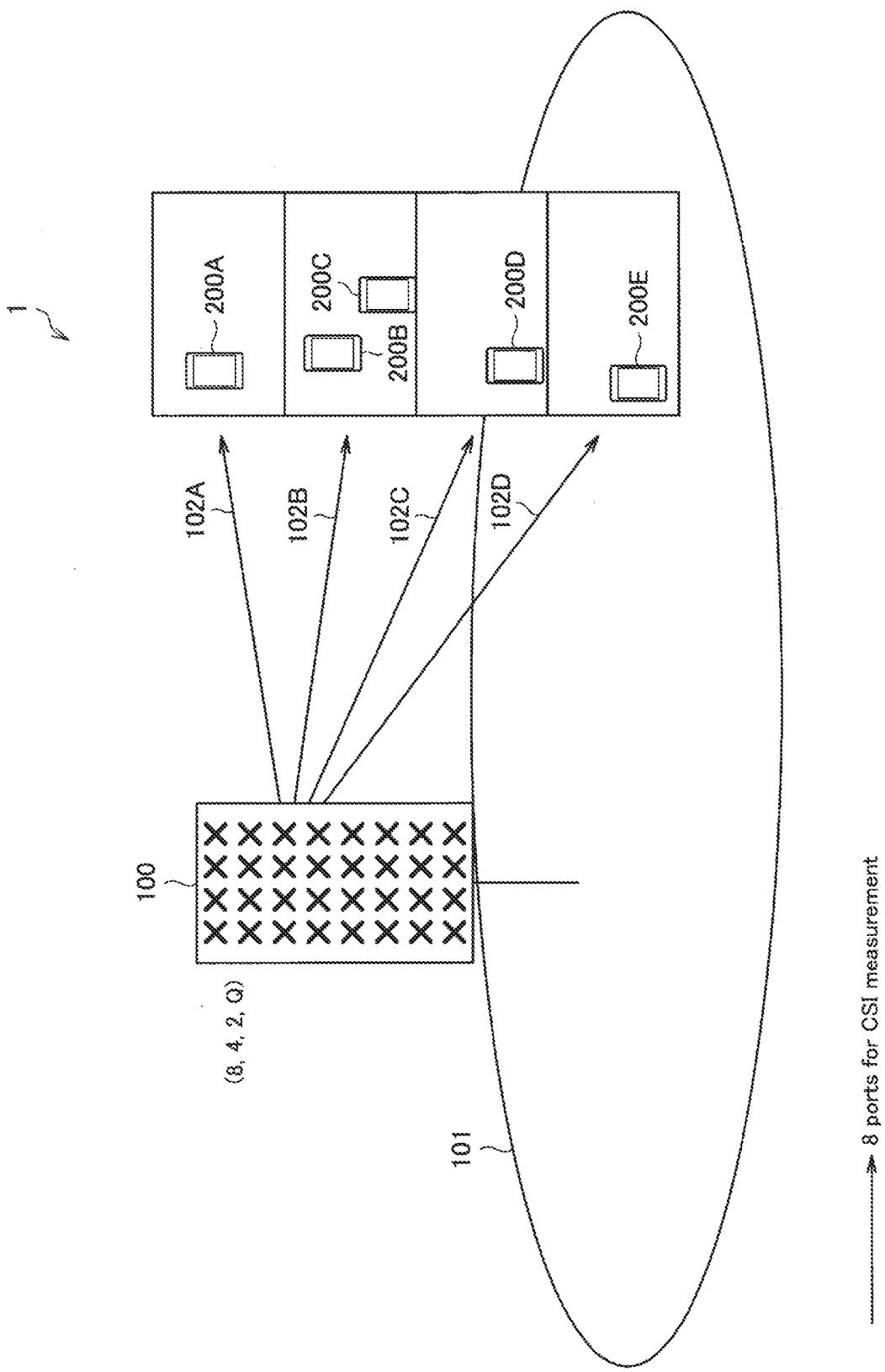
FIG. 1 is an explanatory diagram illustrating an example of a schematic configuration of a system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which elements having substantially the same functional configuration are distinguished by adding different letters after the same reference numeral. For example, a plurality of elements having substantially the same functional configuration are distinguished as terminal apparatuses 200A, 200B, and 200C as necessary. However, when it is not necessary to particularly distinguish a plurality of elements having substantially the same functional configuration, only the same reference numeral is attached. For example, when it is not necessary to particularly distinguish terminal apparatuses 200A, 200B and 200C, they are referred to simply as a "terminal apparatus 200."

Note that description will be provided in the following order.

1. Introduction
1.1. Schematic system configuration
1.2. FD-MIMO
1.3. Examples of subarray type FD-MIMO configuration
1.4. Reference signal for channel estimation in related art
1.5. Channel state report in related art
1.6. Technical problems
2. Configuration example
2.1. Configuration example of base station
2.2. Configuration of terminal apparatus
3. First embodiment
3.1. First example
3.2. Second example
3.3. Third example
4. Second embodiment
5. Application example
6. Conclusion

1. INTRODUCTION

1.1. Schematic System Configuration

A schematic configuration of a system 1 according to an embodiment of the present disclosure will be described first with reference to FIG. 1 and FIG. 2.

FIG. 1 is an explanatory diagram illustrating an example of a schematic configuration of the system 1 according to an embodiment of the present disclosure. Referring to FIG. 1, the system 1 includes a wireless communication apparatus 100 and a terminal apparatus 200.

The wireless communication apparatus 100 is a communication apparatus which provides wireless communication service to subordinate apparatuses. For example, the wireless communication apparatus 100 is a base station in a cellular system (or a mobile communication system). The base station 100 performs wireless communication with an apparatus (for example, the terminal apparatus 200) located inside a cell 101. For example, the base station 100 transmits a downlink signal of the terminal apparatus 200 and receives an uplink signal from the terminal apparatus 200. The cell 101 may be operated in accordance with an arbitrary wireless communication scheme such as, for example, LTE, LTE-advanced (LTE-A), GSM (registered trademark), UMTS, W-CDMA, CDMA200, WiMAX, WiMAX2 and IEEE802.16.

Here, the base station 100 is also referred to as an eNodeB (or eNB). The eNodeB here may be eNodeB defined in the LTE or the LTE-A, and may more typically mean communication equipment. Further, the base station 100 may be a macro cell base station which forms a macro cell, or a small cell base station which forms a small cell.

The base station 100 is logically connected to other base stations with, for example, an X2 interface, and can transmit/receive control information, or the like. Further, the base station 100 is logically connected to a core network with, for example, an S1 interface, and can transmit/receive control information, or the like. Note that communication between these apparatuses can be physically relayed by various apparatuses.

The terminal apparatus 200 is a communication apparatus which can perform communication in a cellular system (or a mobile communication system). The terminal apparatus 200 performs wireless communication with a wireless communication apparatus (for example, the base station 100) in the cellular system. For example, the terminal apparatus 200 receives a downlink signal from the base station 100 and transmits an uplink signal to the base station 100.

Here, the terminal apparatus 200 is also referred to as a user. The user can be also referred to as user equipment (UE). The UE here may be UE defined in LTE or LTE-A and may more typically mean communication equipment.

The base station 100 has a function of FD-MIMO which will be described later, and can transmit information to the terminal apparatus 200 using a beam.

Figure 2:
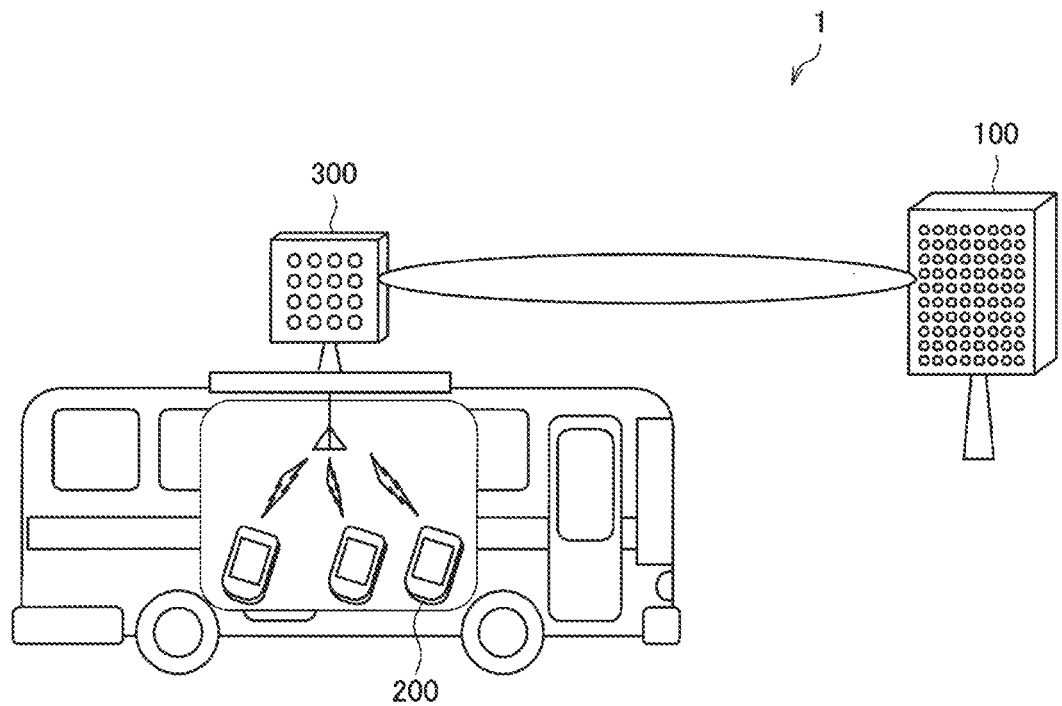
FIG. 2 is an explanatory diagram illustrating an example of a schematic configuration of the system according to the embodiment.

FIG. 2 is an explanatory diagram illustrating an example of a schematic configuration of the system 1 according to an embodiment of the present disclosure. Referring to FIG. 2, the system 1 includes a base station 100, a terminal apparatus 200 and a relay apparatus 300. The relay apparatus 300 has functions of both the base station 100 and the terminal apparatus 200. For example, the relay apparatus 300 functions as the terminal apparatus 200 and performs communication with the base station 100 which uses FD-MIMO. Further, for example, the relay apparatus 300 functions as the base station 100 and provides wireless communication service to the subordinate terminal apparatus 200 using FD-MIMO.

The relay apparatus 300 is also referred to as UE-Relay. The UE-Relay here may be a so-called relay node, and may more typically mean communication equipment.

1.2. FD-MIMO

To address recent rapid increase in traffic, it is urgent that wireless access capabilities are improved. To realize a high-speed and large-capacity wireless access network, it is studied to arrange a macro cell in which a relatively low frequency of an ultra-high frequency (UHF) band is used and a small cell in which a relatively high frequency is used in an overlay manner. Further, in a small cell in which a high frequency band is used, it is studied to utilize full-dimension multiple-input and multiple-output (FD-MIMO) which compensates for a large propagation loss.

In FD-MIMO, it is possible to direct a sharp beam toward upper floors of a building using an array antenna in which a number of antenna elements are two-dimensionally arranged. In FD-MIMO, a use case is studied which improves coverage of the building by using a beam sectored for each tilt angle, or the like. For example, regarding the example illustrated in FIG. 1, the base station 100 uses a beam 102A for a terminal apparatus 200A on the fourth floor of the building. In a similar manner, the base station 100 uses a beam 102B for terminal apparatuses 200B and 200C on the third floor, and uses a beam 102C for a terminal apparatus 200D on the second floor, and uses a beam 102D for a terminal apparatus 200E on the ground floor. In this manner, coverage of the building is improved.

In FD-MIMO in which a sharp beam is formed, and a signal is transmitted using an array antenna including a number of antenna elements, it is desired to transmit a number of reference signals for determining a weighting matrix of an antenna. To solve a problem of overhead of the reference signals, a problem of increase in processing at the eNB and the UE, and a problem of increase in cost of a wireless apparatus of the eNB, employment of a configuration of subarray type FD-MIMO and a beamformed reference signal, or the like, is studied.

The eNB can beamform and transmit a CSI-RS using a cell-specific weighting matrix allocated for each subarray. This beamformed CSI-RS will be also referred to as a cell-specific beamformed CSI-RS in the following description. To transmit data to UE which detects the cell-specific beamformed CSI-RS, it is studied to allocate the same cell-specific beam, that is, multiply data by a cell-specific weighting matrix which is the same as that of the cell-specific beamformed CSI-RS. Further, it is studied to allocate a plurality of cell-specific beams to UE which detects a plurality of cell-specific beamformed CSI-RSs and multiply data to the UE by a UE-specific weighting matrix and a plurality of cell specific weighting matrices and transmit the data. In this case, it becomes possible to provide a sharper beam to the UE and provide higher communication quality and a higher data rate.

For example, it is preferable that the UE which moves at high speed frequently measures and reports the cell-specific beamformed CSI-RS. The cell-specific beamformed CSI-RS which is actually measured by the UE is merely part of the whole. However, because a number of radio resources are used for transmission of the cell-specific beamformed CSI-RS, there is a problem that overhead increases as transmission is more frequently performed. Further, a relay node is also proposed which relays data to a plurality of UEs in vehicles using array antennas which are mounted on the vehicles such as a train and a bus which move at high speed, and means for determining a weighting matrix for the relay node is also desired. For example, concerning the example illustrated in FIG. 2, means for determining a weighting matrix for a beam from the base station 100 to the relay apparatus 300, and means for determining a weighting matrix for a beam from the relay apparatus 300 to the base station 100 are desired.

Therefore, in an embodiment of the present disclosure, a mechanism is proposed in which a UE-specific beamformed downlink CSI-RS to be transmitted by an eNB is arranged in a downlink radio resource which is allocated by the eNB to UE in an RRC connected state, and the UE reports a measurement result. By this means, the eNB can continue to provide beams of FD-MIMO to the UE which moves at high speed.

Further, in the present embodiment, a mechanism is proposed in which a UE-specific uplink CSI-RS (UE-specific UL CSI-RS) to be transmitted by the UE is arranged in an uplink radio resource which is allocated by the eNB to the UE, and the eNB notifies the UE of a recommended value of a transmission antenna weighting coefficient. By this means, the UE which moves at high speed can continue to provide beams of FD-MIMO to the eNB. Note that the UE-specific uplink CSI-RS may be beamformed and transmitted, or may be transmitted without being beamformed.

1.3. Examples of Subarray Type FD-MIMO Configuration

In FD-MIMO, the number of antenna elements constituting the array antenna is extremely large. Therefore, a configuration is studied in which an analog fixed phase shifter is disposed between a transceiver unit (TXRU) which supplies signals to a plurality of antenna elements and each antenna element (3GPP TR36.897 v0.1.1). By this means, it becomes possible to simplify a baseband (BB) circuit and reduce cost of wireless equipment. Further, because a size of a weighting matrix which is to be adjusted for each user while a sharp beam is maintained, is limited compared to a case where weighting coefficients for all the antenna elements are adjusted, it becomes possible to reduce processing load.

For example, in an antenna array including M×N antenna elements, in the case where M antenna elements in a vertical direction are divided into subarrays and connected to TXRUs, when the number of TXRUs in the vertical direction is $M_{TXRU}$, the total number of TXRUs becomes $M_{TXRU} \times N$. When a tilt angle of a beam to be radiated from a TXRU is $\theta_{etilt}$, a weighting coefficient w between the TXRU and an antenna element can be expressed with the following equation.

[Math. 1]

$$w_k = \frac{1}{\sqrt{K}} \exp\left(-j\frac{2\pi}{\lambda}(k-1)d_V \cos\theta_{etilt}\right) \text{ for } k = 1, \ldots, K \quad (1)$$

Beam transmission processing using the above-described subarray type antenna array will be specifically described below with reference to FIG. 3 to FIG. 7.

FIG. 3 to FIG. 7 are explanatory diagrams for explaining an example of subarray type FD-MIMO.

Figure 3:
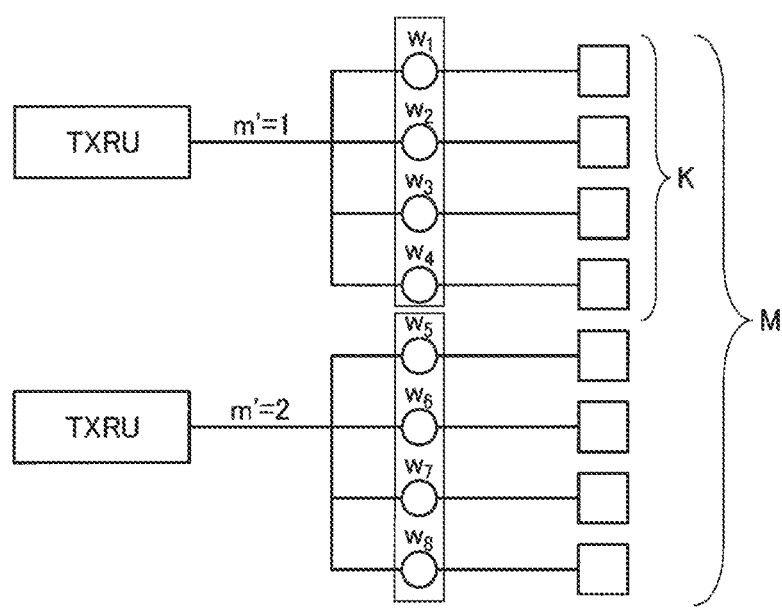
FIG. 3 is an explanatory diagram for explaining an example of subarray type FD-MIMO.

FIG. 3 illustrates an example of connection between the TXRUs and the antenna elements. As illustrated in FIG. 3, a TXRU with an index m'=1 is connected to K=4 antenna elements, and weighting coefficients $w_1$ to $w_4$ are associated. Further, a TXRU with an index m'=2 is connected to K=4 antenna elements, and weighting coefficients $w_5$ to $w_8$ are associated.

Figure 4:
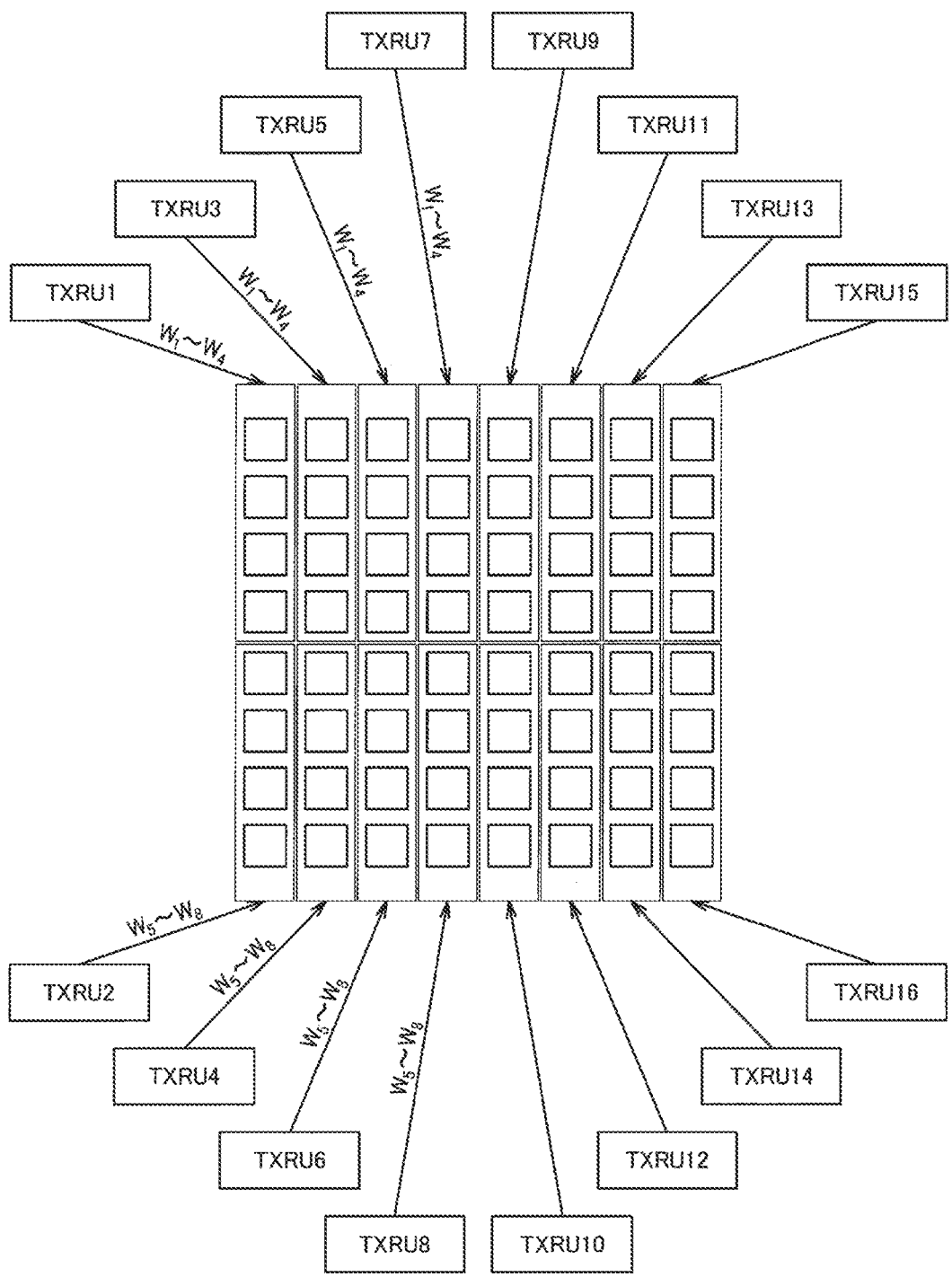
FIG. 4 is an explanatory diagram for explaining an example of subarray type FD-MIMO.

FIG. 4 illustrates an example where an antenna array including 64 elements of M=8 and N=8 is connected to 16 TXRUs. For example, a subarray is formed with 4 antenna elements in the vertical direction, and different TXRUs are connected for each subarray. Numbers assigned to the TXRUs illustrated in FIG. 4 are indexes of the TXRUs. The numbers are similarly assigned in other drawings. Weighting coefficients associated with the TXRUs 1, 3, 5, 7, 9, 11, 13 and 15 may be $w_1$ to $w_4$ in common or may be different from one another. Further, weighting coefficients associated with the TXRUs 2, 4, 6, 8, 10, 12, 14 and 16 may be $w_5$ to $w_8$ in common or may be different from one another.

Figure 5:
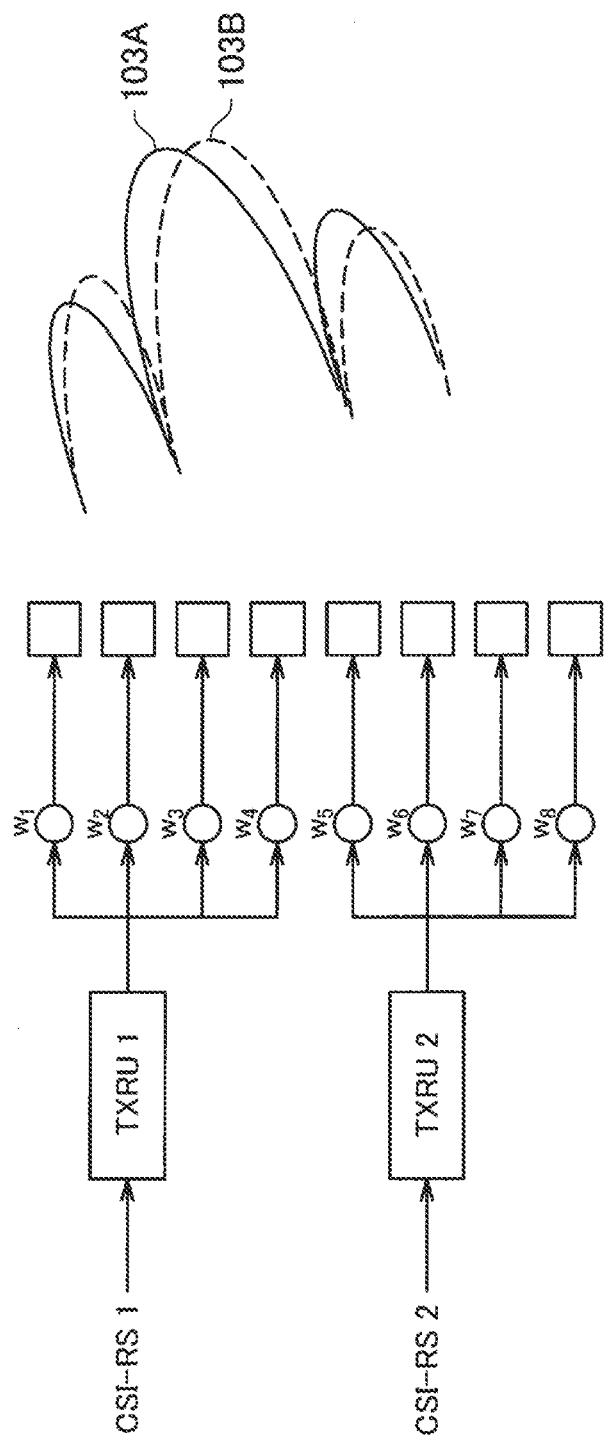
FIG. 5 is an explanatory diagram for explaining an example of subarray type FD-MIMO.

FIG. 5 illustrates an example where CSI-RSs are transmitted using beams formed by the antenna array. Numbers assigned to the CSI-RSs illustrated in FIG. 5 are indexes of the CSI-RSs. For example, a beam 103A is transmitted from antenna elements connected to a TXRU 1, and carries a CSI-RS 1. Further, a beam 103B is transmitted from antenna elements connected to a TXRU 2, and carries a CSI-RS 2. The CSI-RSs carried using these respective beams may be cell-specific beamformed CSI-RSs.

Figure 6:
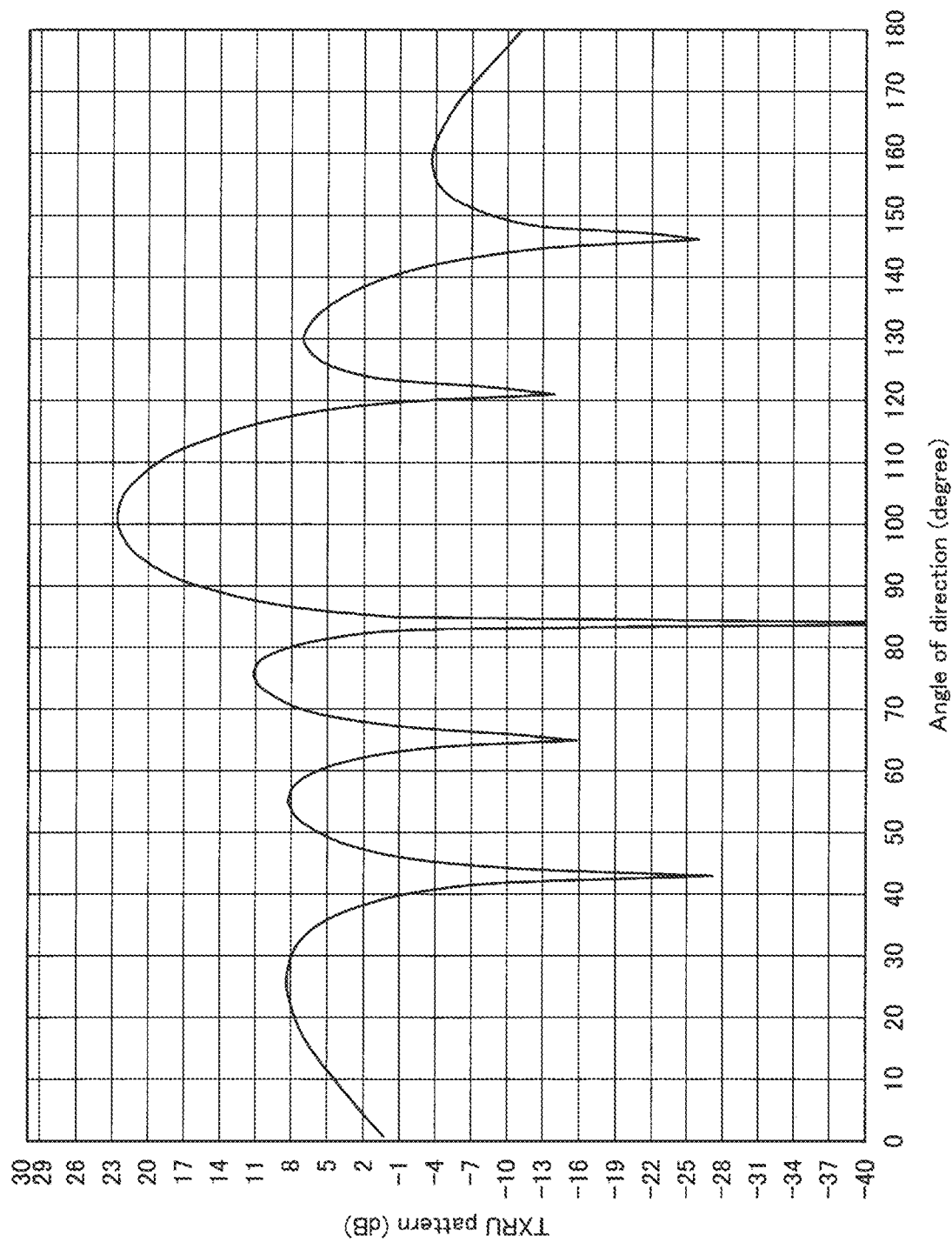
FIG. 6 is an explanatory diagram for explaining an example of subarray type FD-MIMO.

FIG. 6 illustrates an example of a beam pattern radiated from the TXRUs in the case where M=8, N=8 and $M_{TXRU}$=2. All the TXRUs may use the same weighting coefficient w, and beams may have same directivity.

Figure 7:
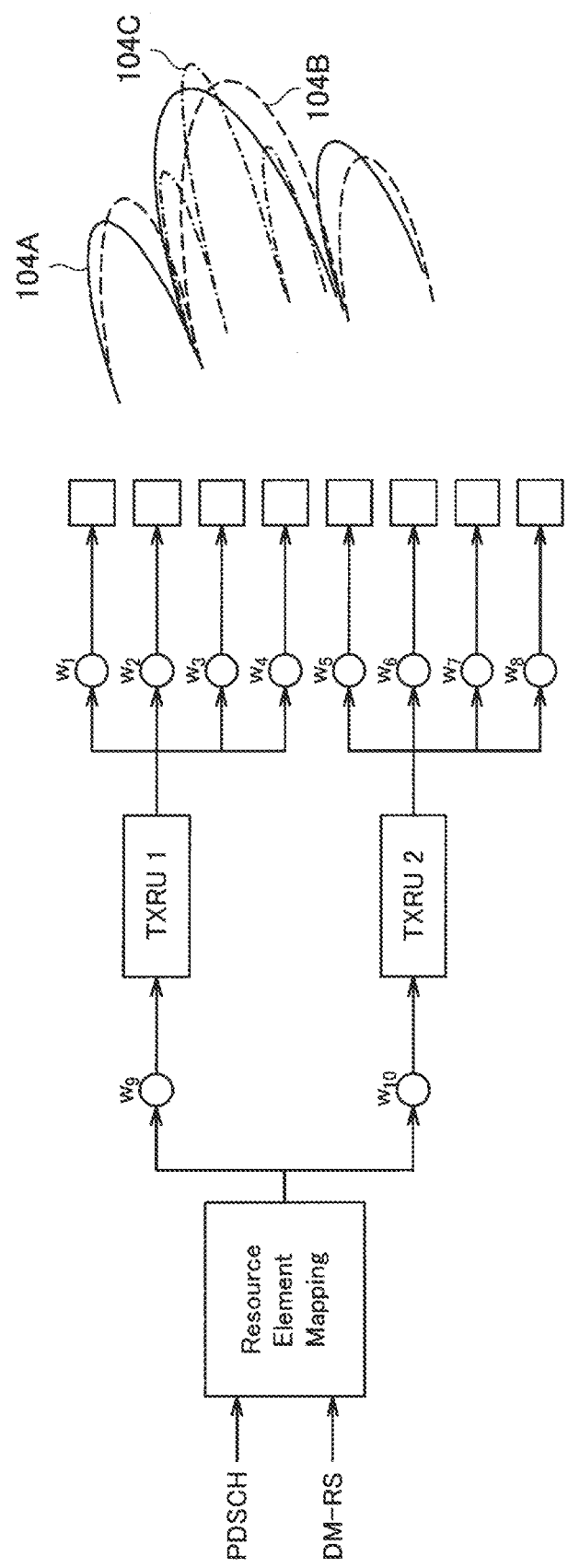
FIG. 7 is an explanatory diagram for explaining an example of subarray type FD-MIMO.

FIG. 7 illustrates an example where a physical downlink shared channel (PDSCH) and a DM-RS are transmitted using a beam formed by the antenna array. As illustrated in FIG. 7, the PDSCH and the DM-RS are mapped to resource elements, multiplied by a pre-weight $w_9$ or $w_{10}$ and input to the respective TXRUs. A beam 104A is transmitted from antenna elements connected to the TXRU 1. Further, a beam 104B is transmitted from antenna elements connected to the TXRU 2. A beam 104C is transmitted from antenna elements connected to the TXRU 1 and the TXRU 2, and carries the PDSCH and the DM-RS. As illustrated in FIG. 7, if a weighting matrix of further inserting appropriate pre-weights $w_9$ and $w_{10}$ to the respective TXRUs is multiplied, it is possible to form a further sharper beam as the beam of the PDSCH. For example, the eNB may adjust the pre-weights $w_9$ and $w_{10}$ to be placed before the TXRUs so that the beam of the PDSCH becomes optimal from a channel state report of the UE.

1.4. Reference Signal for Channel Estimation in Related Art

The CSI-RS is a reference signal for downlink channel estimation for determination of a modulation scheme, determination of an antenna weight coefficient of MIMO and beamforming, or the like. The UE receives the CSI-RS and reports a channel estimation result to the eNB as the channel state report.

Figure 8:
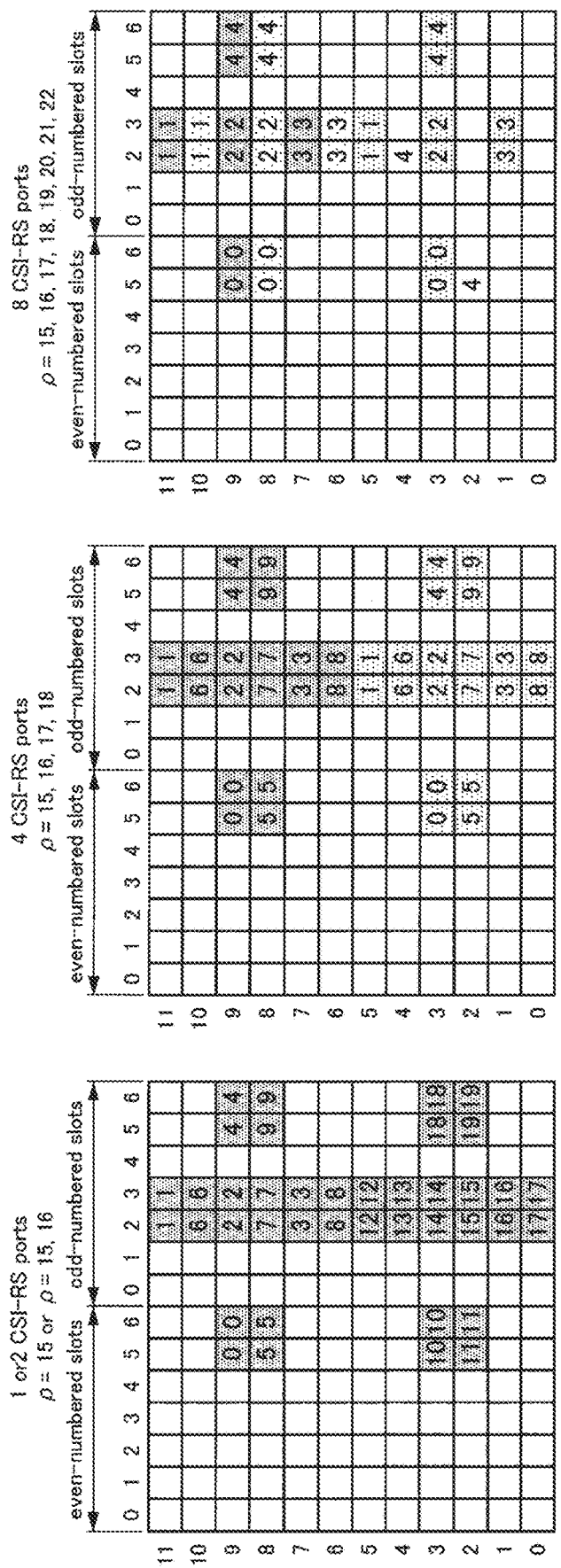
FIG. 8 is a diagram illustrating a mapping example of a CSI-RS to resource elements.

Antenna ports 15 to 22 are used in accordance with the number of reference signals (for example, 1, 2, 4 or 8) constituting the CSI-RS. FIG. 8 is a diagram illustrating a mapping example of the CSI-RS to the resource elements.

The UE is notified of antenna ports from which the CSI-RS is to be transmitted, positions of resource elements in which the CSI-RS is to be inserted, information regarding subframes in which the CSI-RS is to be inserted, or the like, using RRC signaling by CSI reference signal (CSI-RS) information. An example of a configuration of a message for making a notification of the CSI-RS information is indicated in Table 1 below. As indicated in Table 1 below, the message includes an antenna port count, a CSI reference signal configuration, a subframe configuration, or the like.

TABLE 1

| Information Elements | |
|---|---|
| CSI reference Signal | CHOICE Release Setup Antenna Ports count CSI Reference Signal Configuration Subframe Configuration Pc |
| Zero Tx Power CSI Reference Signal | CHOICE Release Setup Zero Tx Power Resource Configuration List Zero Tx Power Subframe Configuration |

The antenna port count indicates the number of antenna ports (1, 2, 4 or 8) constituting the CSI-RS. Here, as an example, it is assumed that the number of antenna ports is eight.

The CSI reference signal configuration is a value between 0 and 31. A resource element (k, l) and a time slot to be used by the CSI-RS are determined by the value in a look-up table specified in 3GPP TS36.211 table 6.10.5.2-1, or the like. In a case of eight antenna ports, resource elements of the antenna ports 15 and 16 are specified from the look-up table, and frequency offset values of resource elements to be used by other antenna ports become Table 2 below.

TABLE 2

| Antenna Ports | Normal Cyclic Prefix | Extended Cyclic Prefix |
|---|---|---|
| 15, 16 | 0 | 0 |
| 17, 18 | −6 | −3 |
| 19, 20 | −1 | −6 |
| 21, 22 | −7 | −9 |

Figure 9:
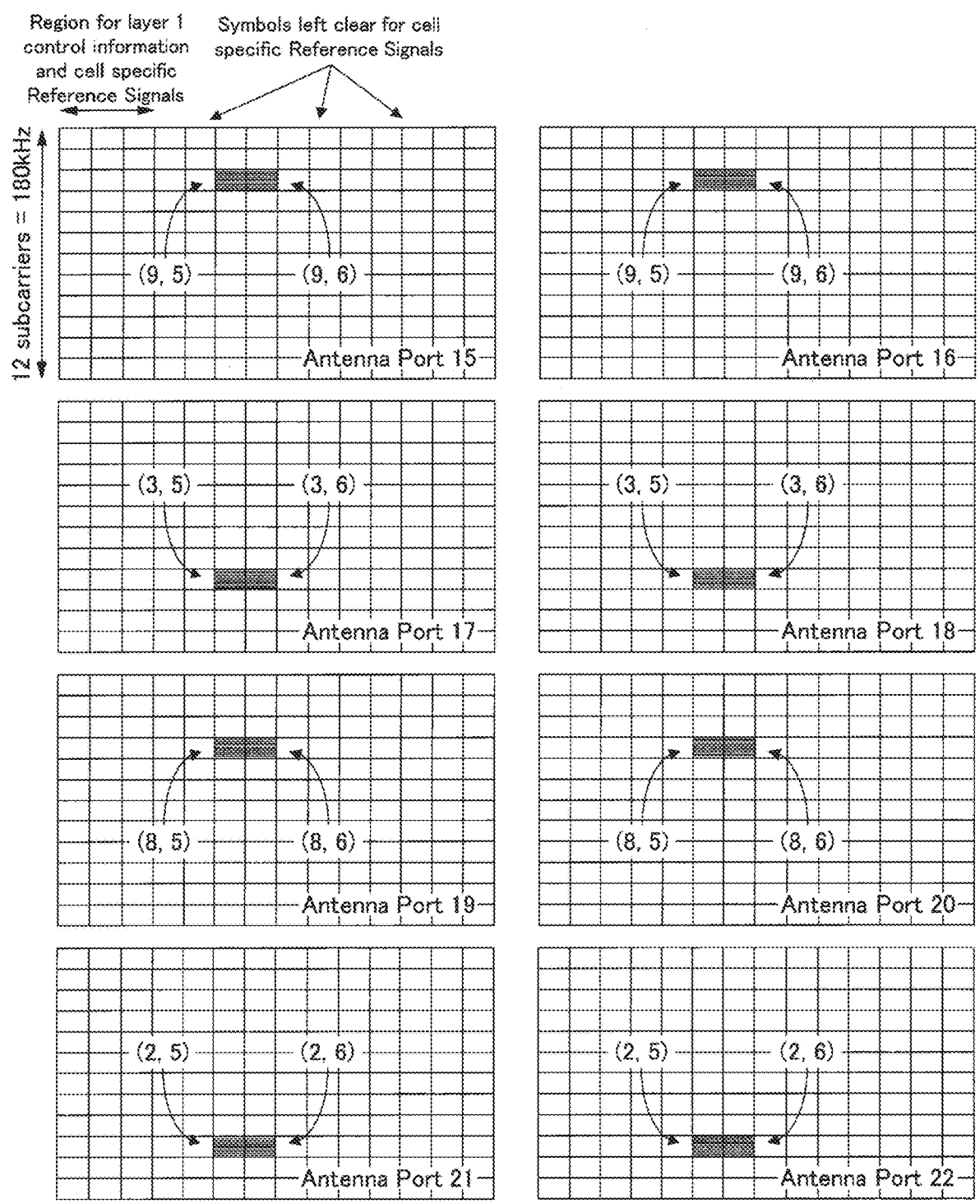
FIG. 9 is a diagram illustrating a usage example of a subframe of the CSI-RS.

FIG. 9 is a diagram illustrating a usage example of resource elements in the case where a value of the CSI reference signal configuration is 0. In the case where the CSI-RS is transmitted using eight antenna ports, as illustrated in FIG. 9, positions of resource elements to be used by antenna ports 15 to 22 become respectively (9, 5), (9, 5), (3, 5), (3, 5), (8, 5), (8, 5), (2, 5) and (2, 5) on the same-numbered slot. Note that the above-described each number in brackets is an index of a subcarrier and an index of a symbol within a resource block. Further, normal CP is assumed in FIG. 9.

Figure 10:
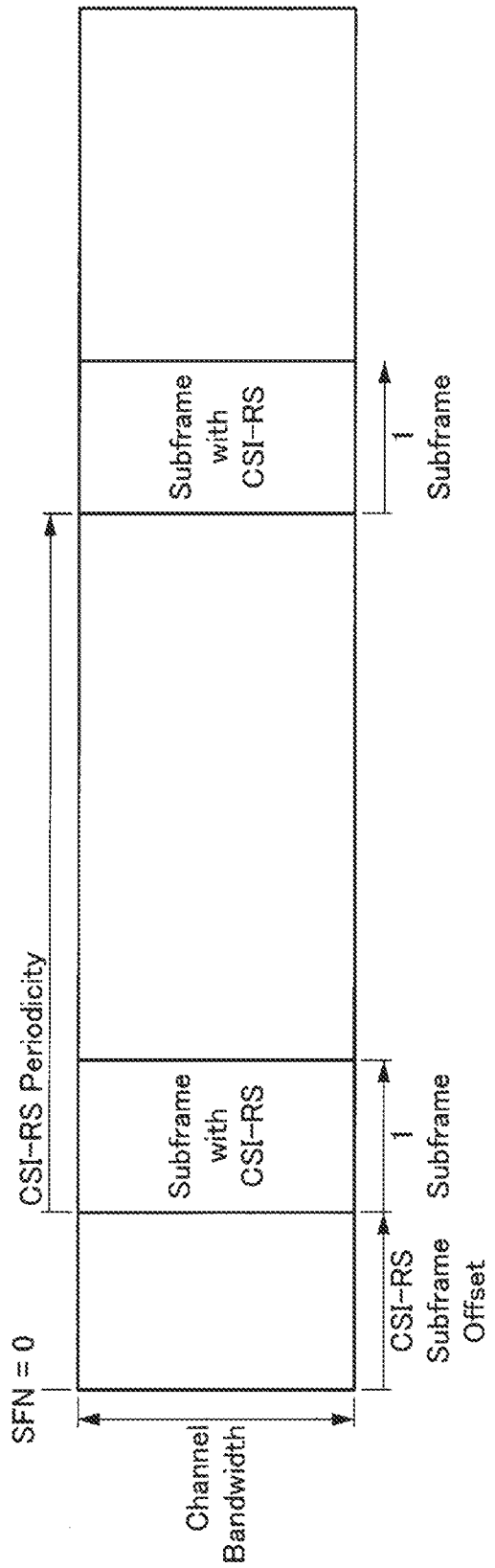
FIG. 10 is a diagram illustrating a usage example of resource elements in the case where a value of a CSI reference signal configuration is 0.

The subframe configuration is a value between 0 and 154. CSI-RS periodicity and CSI-RS subframe offset are provided by the value in a look-up table specified in 3GPP TS36.211 table 6.10.5.3-1. FIG. 10 is a diagram illustrating a usage example of a subframe of the CSI-RS. As illustrated in FIG. 10, the CSI-RS is transmitted after the CSI-RS subframe offset from system frame number (SFN)=0, and, further, the CSI-RS is transmitted also after the CSI-RS periodicity.

In LTE release 12, it is possible to allocate up to three CSI-RS configurations to the UE. The UE makes a channel state report for each CSI-RS configuration notified from the eNB.

1.5. Channel State Report in Related Art

The channel state report includes types indicating periodic or aperiodic, a wideband or a sub-band, and whether or not PMI reporting is required. These types are distinguished as a CSI reporting mode. The UE is notified of the CSI reporting mode by CQI-ReportConfig signaled to the UE using an RRC message. A list of the CSI reporting modes is indicated in Table 3 below.

TABLE 3

| Reporting Mode | Type of Reporting | Applicable Downlink Transmission Modes | PMI Reported |
|---|---|---|---|
| 1-2 | Wideband | 4 and 6<br>8 when PMI/RI reporting is configured<br>9 when PMI/RI reporting is configured and the number of CSI RS ports >1 | Yes, multiple PMI |
| 2-0 | UE Selected Sub-band | 1, 2, 3 and 7<br>8 when PMI/RI reporting is not configured<br>9 when PMI/RI reporting is not configured or the number of CSI RS ports is not >1 | No |
| 2-2 | | 4 and 6<br>8 when PMI/RI reporting is configured<br>9 when PMI/RI reporting is configured and the number of CSI RS ports >1 | Yes, multiple PMI |
| 3-0 | Configured Sub-band | 1, 2, 3 and 7<br>8 when PMI/RI reporting is not configured<br>9 when PMI/RI reporting is not configured or the number of CSI RS ports is not >1 | No |
| 3-1 | | 4, 5 and 6<br>8 when PMI/RI reporting is configured<br>9 when PMI/RI reporting is configured and the number of CSI RS ports >1 | Yes, Single PMI |

Types of reporting in Table 3 correspond to bandwidths to be reported. This point will be described with reference to FIG. 11.

Figure 11:
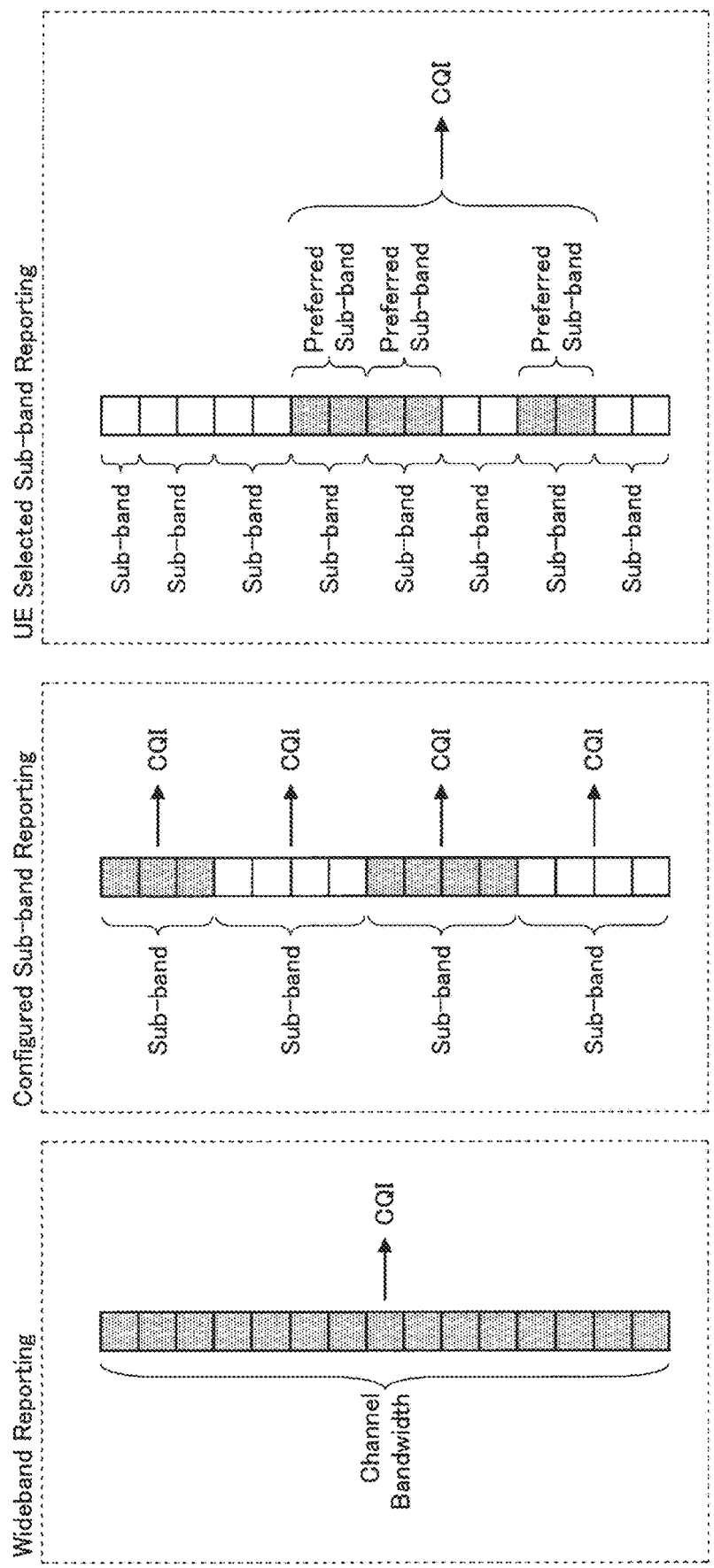
FIG. 11 is a diagram for explaining a difference in a bandwidth which is to be reported in each reporting type.

FIG. 11 is a diagram for explaining a difference in a bandwidth to be reported in each type of reporting. As illustrated in FIG. 11, in the case where the type of reporting is "wideband", CQI of the entire channel bandwidth is reported. Further, in the case where the type of reporting is "configured sub-band", CQI is reported for each predetermined sub-band obtained by dividing the entire channel bandwidth. Further, in the case where the type of reporting is "UE selected sub-band", CQI of a recommended sub-band which is part of the channel bandwidth is reported. Table 5 below indicates a list of relationship between sub-bands and resource blocks in the case where the type of reporting is "UE selected sub-band". As indicated in Table 4 below, for example, a 5 MHz band includes 25 resource blocks, one sub-band is made up of two resource blocks, and the recommended sub-bands are three sub-bands.

TABLE 4

| Channel Bandwidth | Resource Blocks | Sub-band Size (Resource Blocks) | Number of Preferred Sub-bands (M) |
|---|---|---|---|
| 1.4 MHz | 6 | Not Applicable | Not Applicable |
| 3 MHz | 15 | 2 | 3 |
| 5 MHz | 25 | 2 | 3 |
| 10 MHz | 50 | 3 | 5 |
| 15 MHz | 75 | 4 | 6 |
| 20 MHz | 100 | 4 | 6 |

For example, in a CSI reporting mode 2-2 (UE selected sub-band reporting with PMI), a case is assumed where a recommended precoding matrix for performing transmission using a recommended sub-band, and eight CSI-RSs in a transmission mode 9 are used. In this case, the UE is required to report PMI_1 corresponding to the wideband, PMI_2 corresponding to the recommended sub-bands, single CQI for each code word in the case where it is assumed that the recommended precoding matrix is used and transmission is performed using the recommended sub-bands, and positions of the recommended sub-bands. Further, the UE is required to report a recommended precoding matrix in the case where it is assumed that transmission is performed using a full band, and single CQI for each code word in the case where it is assumed that the recommended precoding matrix is used and transmission is performed using a full band.

A timing of the channel state reporting will be described.

In a case of aperiodic CSI reporting, for example, the channel state reporting is triggered by a CSI request using a DCI format 0 or 4 on a physical downlink control channel (PDCCH). Table 5 below indicates a list of bit sequences and content of the CSI request.

TABLE 5

| CSI Request Field | Description |
| --- | --- |
| 00 | No CSI report is triggered |
| 01 | CSI report is triggered for the serving cell |
| 10 | CSI report is triggered for serving cell set 1 |
| 11 | CSI report is triggered for serving cell set 2 |

Then, a frequency division duplex (FDD) terminal transmits a CSI report four subframes after the CSI request is received.

In a case of periodic CSI reporting, a reporting period is signaled to the UE using an RRC message as CQI-PMI configuration index.

The channel state report from the UE is transmitted to the eNB using uplink control information (UCI) in response to a request from the eNB. The UCI is transmitted by utilizing a physical uplink control channel (PUCCH) or a physical uplink shared channel (PUSCH) in a case of periodic CSI reporting, and transmitted by utilizing a PUSCH in a case of aperiodic reporting. In the case where the PUSCH is utilized, the UCI may be transmitted while being multiplexed on data.

The UCI includes the following information.
channel state information (CSI)
channel quality indicators (CQI)
precoding matrix indicators (PMI)
precoding type indicators (PTI)
rank indicators (RI)
scheduling requests (SR)
HARQ acknowledgements Resources of a plurality of types of CSI-RSs and timings of a plurality of reports, or the like, can be set for each CSI process. Specifically, the CSI-RS configurations and the CQI-PMI configuration indexes are associated with CSI process identifiers (IDs).

As described above, in a method of channel state reporting in related art, for example, in the case where a method is assumed in which a beamformed CSI-RS is transmitted within a resource block allocated to UE and the UE is caused to make a report, there is a problem that overhead becomes large. Specifically, for example, in the case where the reporting mode 2-2 (UE selected sub-band reporting with PMI) is designated, the UE is required to report not only the recommended PMI and CQI for a designated sub-band, but also the recommended PMI and CQI for the entire channel bandwidth. Further, the number of resource blocks constituting the sub-band is larger than at least one while the number differs depending on the entire channel bandwidth. That is, there is a problem that it is difficult to report the recommended PMI for, for example, one resource block.

1.6. Technical Problems

A first problem will be described. While a variety of CSI-RSs can be transmitted from the eNB, a cell-specific beamformed CSI-RS which can be received at each UE is limited to only a small part. It is preferable that the UE which moves at high speed frequently performs measurement and reports the PMI to receive allocation of appropriate beams. However, it is difficult to frequently transmit a cell-specific beamformed CSI-RS in terms of overhead.

A second problem will be described. A case is assumed where a UE-specific CSI-RS is transmitted in resource blocks allocated to the UE to cause the beam to follow the moving UE. In this case, because the number of resource blocks to be allocated to the UE and positions of the resource blocks differ depending on scheduling of the moment, it is difficult to satisfy the number of resource blocks which is required for channel state reporting in related art.

A third problem will be described. In the case where a UE-specific CSI-RS is tried to be transmitted in resource blocks allocated to the UE, allocation of the UE-specific CSI-RS is not always appropriate in accordance with moving speed of the UE, and there can be a case where it is necessary to reallocate beams.

A fourth problem will be described. Means for feedback from the eNB, or the like, used by the UE on which the array antenna including a multi-element antenna is mounted, to determine a transmission weighting matrix is not specified.

2. CONFIGURATION EXAMPLE

An example of configurations of the base station 100 and the terminal apparatus 200 which are common configurations in the respective embodiments will be described below.

2.1. Configuration Example of Base Station

Figure 12:
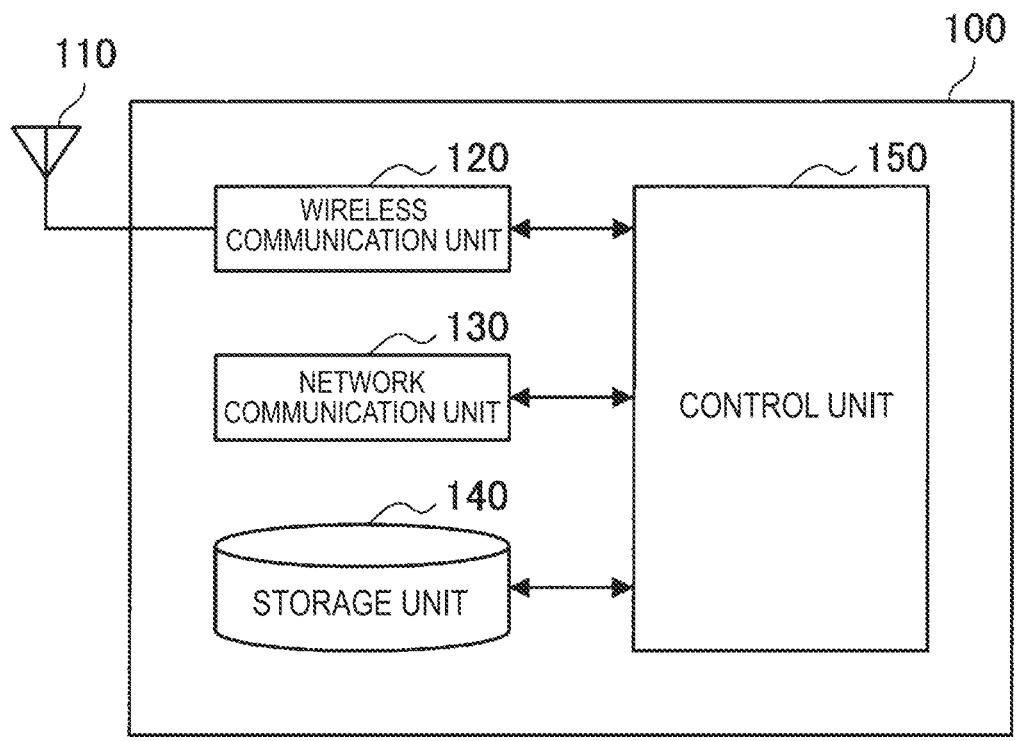
FIG. 12 is a block diagram illustrating an example of a configuration of a base station according to the embodiment.

An example of a configuration of the base station 100 according to an embodiment of the present disclosure will be described with reference to FIG. 12. FIG. 12 is a block diagram illustrating an example of the configuration of the base station 100 according to an embodiment of the present disclosure. Referring to FIG. 12, the base station 100 includes an antenna unit 110, a wireless communication unit 120, a network communication unit 130, a storage unit 140 and a control unit 150.

(1) Antenna Unit 110

The antenna unit 110 radiates signals output from the wireless communication unit 120 to space as radio waves. Further, the antenna unit 110 converts radio waves in space into signals and outputs the signals to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the above-described other nodes include other base stations and a core network node.

(4) Storage Unit 140

The storage unit 140 temporarily or permanently stores programs and various types of data for operation of the base station 100.

(5) Control Unit 150

The control unit 150 provides various functions of the base station 100. The base station 100 operates on the basis of control by the control unit 150. Operation of the base station 100 based on control by the control unit 150 will be described in detail later.

2.2. Configuration of Terminal Apparatus

Figure 13:
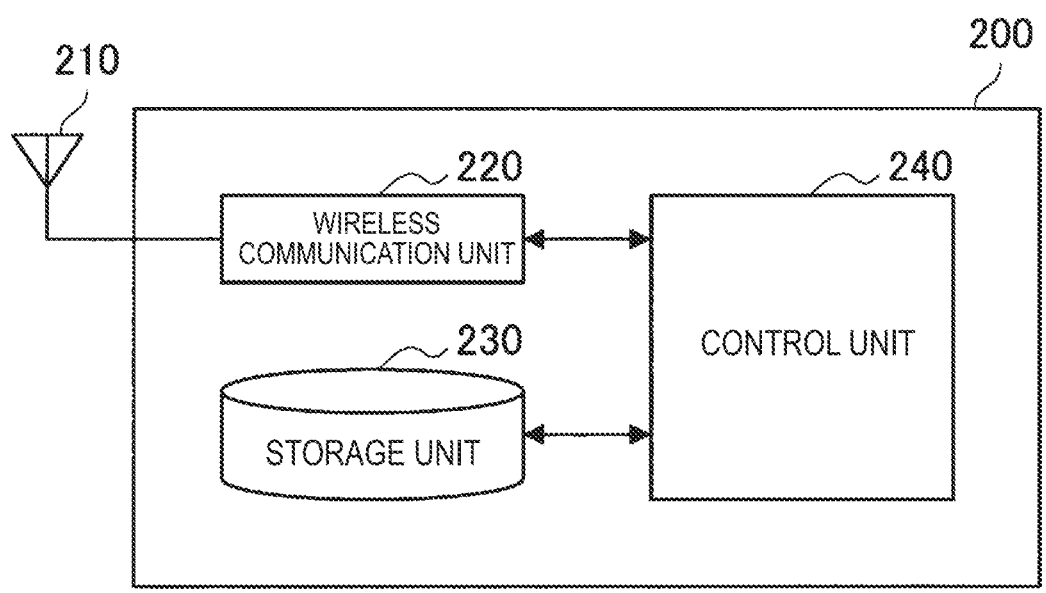
FIG. 13 is a block diagram illustrating an example of a configuration of a terminal apparatus according to the embodiment.

An example of the configuration of the terminal apparatus 200 according to an embodiment of the present disclosure will be described with reference to FIG. 13. FIG. 13 is a block diagram illustrating an example of a configuration of a terminal apparatus 200 according to an embodiment of the present disclosure. Referring to FIG. 13, the terminal apparatus 200 includes an antenna unit 210, a wireless communication unit 220, a storage unit 230, and a control unit 240.

(1) Antenna Unit 210

The antenna unit 210 radiates signals outputted from the wireless communication unit 220 into space as radio waves. Further, the antenna unit 210 converts radio waves in space into signals, and outputs the signals to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs and various types of data for an operation of the terminal apparatus 200.

(4) Control Unit 240

The control unit 240 provides various functions of the terminal apparatus 200. The terminal apparatus 200 operates on the basis of control by the control unit 240. Operation of the terminal apparatus 200 based on control by the control unit 240 will be described in detail later.

3. FIRST EMBODIMENT

The present embodiment is an embodiment in which the base station 100 transmits a UE-specific beamformed downlink CSI-RS.

3.1. First Example

The present example is an example where a reporting mode in which the UE-specific beamformed downlink CSI-RS is made a target of measurement and reporting is newly added.

(1) Transmission of Beamformed CSI-RS

The base station 100 transmits a beamformed CSI-RS. The beamformed CSI-RS here may be a cell-specific beamformed CSI-RS or may be a UE-specific beamformed downlink CSI-RS.

The base station 100 allocates a radio resource for transmission of the UE-specific beamformed downlink CSI-RS, to the terminal apparatus 200 in an RRC connected state. In the present example, this radio resource is downlink. A setting example of downlink resources including the UE-specific beamformed downlink CSI-RS will be described below with reference to FIG. 14.

Figure 14:
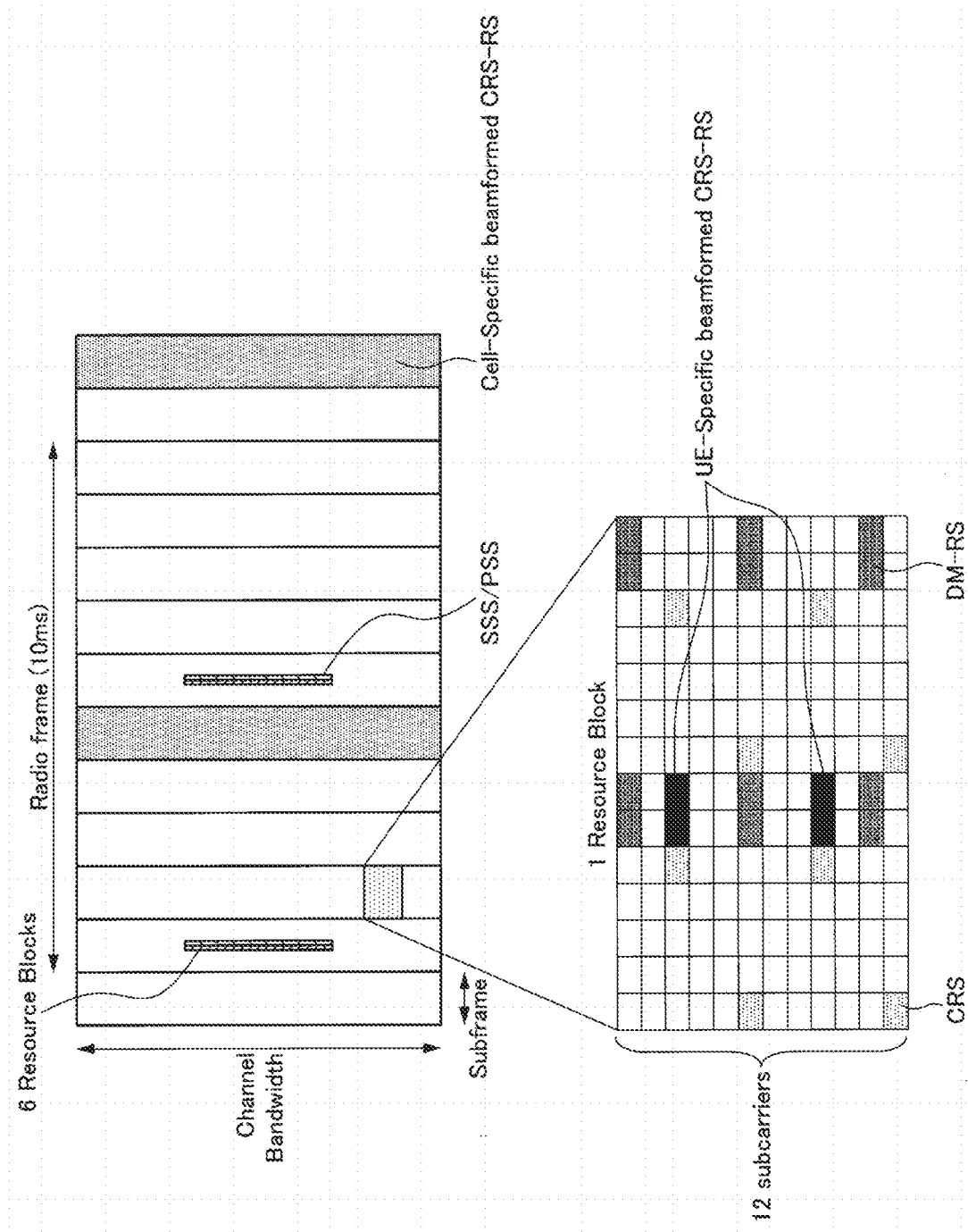
FIG. 14 is a diagram illustrating an example of resource setting according to a first embodiment.

FIG. 14 is a diagram illustrating an example of resource setting according to the present embodiment. As illustrated in FIG. 14, synchronization signals (a primary synchronization signal (PSS) and a secondary synchronization signal (SSS)) are transmitted using six resource blocks. Further, the cell-specific beamformed CSI-RS is transmitted over an entire channel bandwidth. These signals are transmitted to the whole subordinate terminal apparatuses 200. Meanwhile, a signal for each terminal apparatus 200 is transmitted in a resource block which is allocated for each terminal apparatus 200. As illustrated in FIG. 14, in a resource block allocated for each terminal apparatus 200, a cell-specific reference signal (CRS), a DM-RS and a UE-specific beamformed downlink CSI-RS are transmitted. Here, four resource elements allocated to the UE-specific beamformed downlink CSI-RS correspond to four antenna ports.

Beamforming is performed using an antenna array including a plurality of antenna elements. A beamforming technology using an antenna array will be described below with reference to FIG. 15 and FIG. 16.

Figure 15:
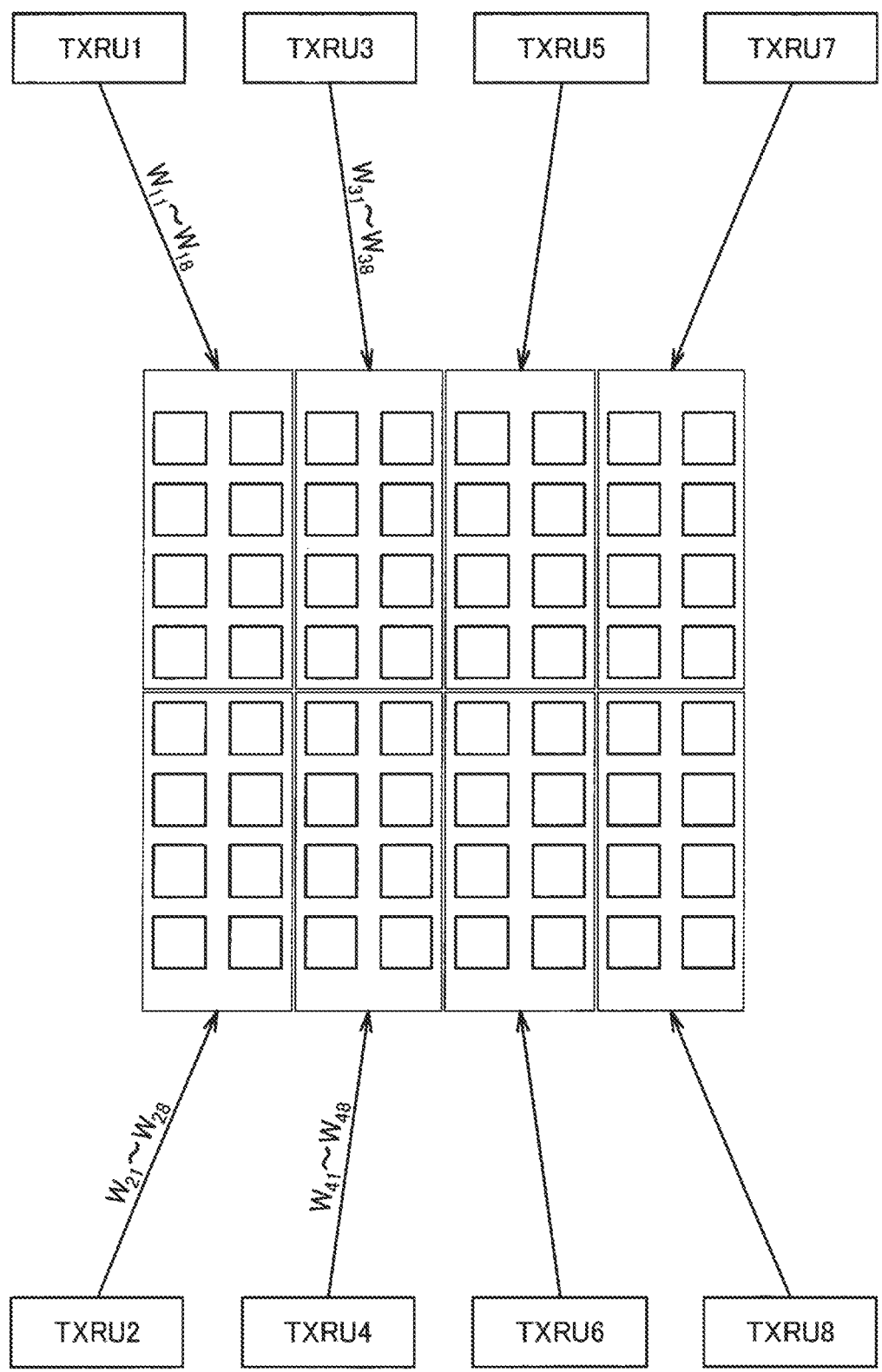
FIG. 15 is an explanatory diagram for explaining a beamforming technology using an antenna array.

FIG. 15 is an explanatory diagram for explaining a beamforming technology using an antenna array. FIG. 15 illustrates an example where an antenna array including 64 elements of M=8 and N=8 is connected to eight TXRUs. For example, it is assumed that analog fixed phase shifters are provided between the antenna elements and the TXRUs. A CSI-RS is beamformed and transmitted from each TXRU using a sub-array including eight antenna elements after being multiplied by each weighting coefficient w. For example, a CSI-RS from a TXRU 1 is multiplied by weighting coefficients $w_{11}$ to $w_{18}$, a CSI-RS from a TXRU 2 is multiplied by weighting coefficients $w_{21}$ to $w_{28}$, a CSI-RS from a TXRU 3 is multiplied by weighting coefficients $w_{31}$ to $w_{38}$, and a CSI-RS from a TXRU 4 is multiplied by weighting coefficients $w_{41}$ to $w_{48}$.

Figure 16:
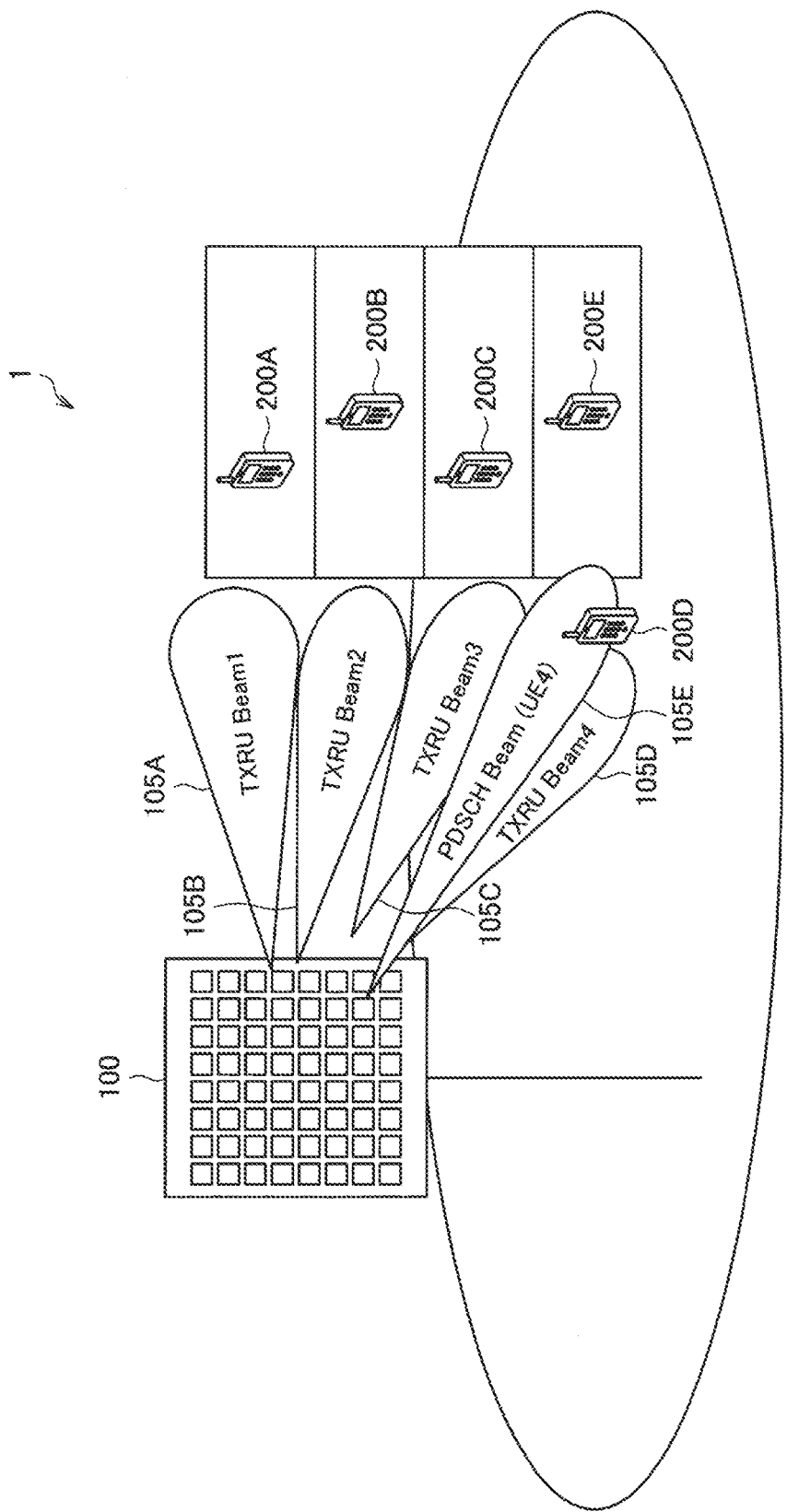
FIG. 16 is an explanatory diagram for explaining a beamforming technology using an antenna array.

FIG. 16 is an explanatory diagram for explaining a beamforming technology using an antenna array. FIG. 16 illustrates only four CSI-RS beams among eight CSI-RS beams transmitted from eight TXRUs. The remaining four CSI-RS beams may be directed to other angles. For example, a beam 105A is transmitted from antenna elements connected to the TXRU 1, a beam 105B is transmitted from antenna elements connected to the TXRU 2, a beam 105C is transmitted from antenna elements connected to the TXRU 3, and a beam 105D is transmitted from antenna elements connected to the TXRU 4. For example, it is assumed that the terminal apparatus 200D can receive the beams 105C and 105D. In this case, the terminal apparatus 200D measures the CSI-RSs transmitted using the beams 105C and 105D and performs channel state reporting. The base station 100 can know an optimal weighting coefficient to be multiplied before the TXRU 3 and the TXRU 4 on the basis of the channel state report from the terminal apparatus 200D, form a beam 105E for transmitting a PDSCH to the terminal apparatus 200D and transmit the beam 105E.

(2) Notification of CSI Reporting Mode

The base station 100 transmits information indicating an operation mode for causing the terminal apparatus 200 to measure a UE-specific beamformed downlink CSI-RS in units of a radio resource and transmit information indicating a measurement result. This information indicating the operation mode may be a CSI reporting mode. Further, this information indicating the operation mode may be a transmission mode.

CSI Reporting Mode

First, the CSI reporting mode will be described. The base station 100 notifies the terminal apparatus 200 which issues an RRC connection request and which supports FD-MIMO of a CQI report configuration (CQI-ReportConfig) through RRC signaling. The CQI report configuration includes, for example, a CSI reporting mode, a CQI-PMI configuration index, or the like.

Table 6 below indicates a list of CSI reporting modes. For example, as indicted in Table 6 below, the CSI reporting mode includes a mode in which a cell-specific beamformed CSI-RS or a UE-specific beamformed downlink CSI-RS is measured. Reporting modes 4-0, 4-1, 4-2 and 4-3 may be newly added. Note that other reporting modes in Table 6 below are existing reporting modes.

TABLE 6

| periodicity | measurement target range | PMI | CSI-RS to be measured | Reporting mode |
|---|---|---|---|---|
| aperiodic | wideband | PMI | Non-beamformed CSI-RS | 1-2 |
|  |  |  | Cell-specific beamformed CSI-RS | 4-0 |
|  | UE selected sub-band | no PMI | Non-beamformed CSI-RS | 2-0 |
|  | UE selected sub-band | PMI | Non-beamformed CSI-RS | 2-2 |
|  |  |  | Cell-specific beamformed CSI-RS | 4-1 |
|  | higher layer configured sub-band | no PMI | Non-beamformed CSI-RS | 3-0 |
|  | higher layer configured sub-band | PMI | Non-beamformed CSI-RS | 3-1 |
|  |  |  | Cell-specific beamformed CSI-RS | 4-2 |
|  | Scheduled Resource Block | PMI | UE-specific beamformed DL CSI-RS | 4-3 |
| periodic | wideband | no PMI | Non-beamformed CSI-RS | 1-0 |
|  |  | PMI | Non-beamformed CSI-RS | 1-1 |
|  | UE selected sub-band | no PMI | Non-beamformed CSI-RS | 2-0 |
|  |  | PMI | Non-beamformed CSI-RS | 2-1 |

As indicated in Table 6 above, various kinds of setting regarding channel state reporting are made in accordance with a type of the CSI reporting mode. Specifically, whether a reporting timing is periodic or aperiodic is indicated by the type of the CSI reporting mode. Further, whether the measurement target range is a wideband, a sub-band or a scheduled resource block is indicated by the type of the CSI reporting mode. Still further, whether or not PMI reporting is required is indicated by the type of the CSI reporting mode. Further, whether the CSI-RS to be measured is a CSI-RS which is not beamformed, a cell-specific beamformed CSI-RS or a UE-specific beamformed downlink CSI-RS is indicated by the type of the CSI reporting mode.

Cell-Specific Beamformed CSI-RS

For example, the base station 100 may cause the terminal apparatus 200 to which a beam of FD-MIMO is first allocated to measure and report a cell-specific beamformed downlink CSI-RS. To achieve this, the base station 100 notifies the terminal apparatus 200 of, for example, a CQI report configuration in which the reporting mode 4-0 is designated. As indicated in Table 6 above, in the reporting mode 4-0, the reporting timing is aperiodic, the measurement target range is a wideband, PMI reporting is required, and the CSI-RS to be measured is a cell-specific beamformed CSI-RS.

UE-Specific Beamformed Downlink CSI-RS

For example, the base station 100 may cause the terminal apparatus 200 in an RRC connected state, to which a PDSCH beam of FD-MIMO is allocated once to measure and report a UE-specific beamformed downlink CSI-RS. Specifically, the base station 100 frequently transmits a UE-specific beamformed downlink CSI-RS in a resource block to be allocated to the terminal apparatus 200 and causes the terminal apparatus 200 to make a report. By this means, because it becomes not necessary to transmit a cell-specific beamformed CSI-RS using the entire channel bandwidth for each terminal apparatus 200, it becomes possible to reduce overhead for transmitting the cell-specific beamformed CSI-RS. Further, even in the case where the terminal apparatus 200, for example, moves, it becomes possible to cause a beam to appropriately follow the terminal apparatus 200.

To achieve this, the base station 100 notifies the terminal apparatus 200 of a CQI report configuration in which, for example, the reporting mode 4-3 is designated. As indicated in Table 6 above, in the reporting mode 4-3, the reporting timing is aperiodic, the measurement target range is a scheduled resource block, PMI reporting is required, and the CSI-RS to be measured is a UE-specific beamformed downlink CSI-RS. For example, in the reporting mode 4-3, the terminal apparatus 200 reports a recommended precoding matrix to be used by the base station 100 to perform transmission using the scheduled resource block, and a single CQI for each code word in the case where it is assumed that the recommended precoding matrix is used and transmission is performed using the same resource block. In this case, the terminal apparatus 200 does not have to report a position of the resource block, because the base station 100 allocates a resource block in which the UE-specific beamformed downlink CSI-RS is to be transmitted.

Transmission Mode

The transmission mode will be described next.

The base station 100 may notify the terminal apparatus 200 of the transmission mode in place of or along with notification of the above-described CSI reporting mode.

Table 7 below indicates a list of downlink transmission modes. For example, as indicated in Table 7 below, transmission modes 11 and 12 may be added. The transmission mode 11 is a transmission mode for transmitting a downlink signal of FD-MIMO. The transmission mode 12 is a transmission mode for transmitting a UE-specific beamformed downlink CSI-RS in a resource block of the downlink signal of FD-MIMO. Note that other transmission modes in Table 7 below are existing transmission modes.

TABLE 7

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br>If the UE is configured with PMI/RI reporting: if the number of CSI-RS ports is one, single-antenna port, port 7; otherwise up to 8 layer transmission, ports 7-14 (see subclause 7.1.5B) |
| 10 | If a CSI process of the UE is configured without PMI/RI reporting: if the number of CSI-RS ports is one, single-antenna port, port7; otherwise transmit diversity<br>If a CSI process of the UE is configured with PMI/RI reporting: if the number of CSI-RS ports is one, single-antenna port, port 7; otherwise up to 8 layer transmission, ports 7-14 (see subclause 7.1.5B) |
| 11 | FD-MIMO |
| 12 | FD-MIMO, UE-specific beamformed DL CSI-RS |

The base station 100 notifies the terminal apparatus 200 in an RRC connected state, which supports FD-MIMO, of a downlink transmission mode through RRC signaling. For example, the terminal apparatus 200 may be notified of the transmission mode 12 instead of being notified of the reporting mode 4-3 as the CSI reporting mode. In this case, the terminal apparatus 200 may judge that the CSI reporting mode is the reporting mode 4-3 by notification of the transmission mode 12.

(3) Notification of CSI-RS Information

The base station 100 transmits CSI-RS information to the terminal apparatus 200.

The base station 100 notifies the terminal apparatus 200 which supports FD-MIMO of the CSI-RS information through RRC signaling. Content of the CSI-RS information is, as described above with reference to Table 1, CSI-RS configuration information. Particularly, the base station 100 can notify the terminal apparatus 200 of CSI-RS information regarding the cell-specific beamformed CSI-RS and CSI-1RS configuration regarding the UE-specific beamformed downlink CSI-RS.

In the example illustrated in FIG. 16, the base station 100 may notify the terminal apparatus 200D of the CSI-RS information through RRC signaling to transmit the UE-specific beamformed downlink CSI-RS including two beamformed CSI-RSs. As an example, it is assumed that the number of antenna ports is two. For example, the base station 100 makes a notification of the CSI-RS information in which a value of the CSI reference Signal configuration is 0. The positions of the resource elements to be used by the antennas 15 and 16 respectively become (9, 5) and (9, 5) on the same-numbered slot. Note that use of the same resource element means that multiplexing is performed.

While, in the above description, an example has been described where the CSI-RS information is transmitted through RRC signaling to transmit the UE-specific beamformed downlink CSI-RS, the present technology is not limited to such an example. For example, the base station 100 may transmit downlink control information (DCI) including information indicating that the UE-specific beamformed downlink CSI-RS is transmitted. Further, the base station 100 may transmit DCI including the number of antenna ports to be used for transmission of the UE-specific beamformed downlink CSI-RS. Then, the base station 100 may transmit the DCI including these information every time a downlink resource is allocated. By this means, the base station 100 can make a notification of information of the UE-specific beamformed downlink CSI-RS every time scheduling is performed. In accordance with this, it becomes possible to frequently change the CSI-RS information of the UE-specific beamformed downlink CSI-RS.

(4) Trigger of CSI Report

The base station 100 notifies the terminal apparatus 200 of a CSI request. By this means, the base station 100 can receive a CSI report from the terminal apparatus 200.

The CSI request is made using, for example, a DCI format 0 or 4 on the PDCCH. Table 8 below indicates a list of bit sequences and content of the CSI request. As indicated in Table 8 below, the CSI request may be three bits by bits corresponding to the beamformed CSI-RS being added to the bit sequence indicated in Table 5 above.

TABLE 8

| CSI request | Description |
|---|---|
| 000 | No aperiodic CSI report is triggered |
| 001 | Aperidic CSI report is triggered for serving cell 'c' |
| 010 | Aperidic CSI report is triggered for the 1st set of serving cells |
| 011 | Aperidic CSI report is triggered for the 2nd set of serving cells |
| 100 | Aperidic beamformed CSI report 0 is triggered for serving cell 'c' |
| 101 | Aperidic beamformed CSI report 1 is triggered for serving cell 'c' |

For example, in the case where a most significant bit is "1", the terminal apparatus 200 recognizes that transmission of a CSI report with respect to the beamformed CSI-RS is requested. Further, one or more bits to be newly added may be further associated with a plurality of types of CSI process. The beamformed CSI-RS here may be a cell-specific beamformed CSI-RS or may be a UE-specific beamformed downlink CSI-RS.

Here, in the present example, the base station 100 makes a notification that DL data including the UE-specific beamformed downlink CSI-RS is allocated to the terminal apparatus 200 using the DCI. This notification may trigger a CSI report. That is, a CSI request does not have to be used for requesting a CSI report regarding the UE-specific beamformed downlink CSI-RS.

(5) CSI Report

The terminal apparatus 200 measures a terminal-specific reference signal (that is, a UE-specific beamformed downlink CSI-RS) transmitted in a radio resource allocated for each terminal apparatus 200 and transmits information indicating a measurement result. This information indicating the measurement result is used for transmission beamforming by the base station 100. In the present example, this information indicating the measurement result is a channel state report (that is, a CSI report). Because the UE-specific beamformed downlink CSI-RS is transmitted in the radio resource for each terminal apparatus 200, it becomes possible to avoid a problem of overhead which occurs in the case where a beamformed cell-specific beamformed CSI-RS is frequently transmitted.

The terminal apparatus 200 transmits a CSI report after a predetermined number of subframes by being triggered by notification that the UE-specific beamformed downlink CSI-RS is allocated using the DCI, that is, by reception of DL data including the UE-specific beamformed downlink CSI-RS. The terminal apparatus 200 may transmit a CSI report along with a hybrid automatic repeat-request (HARQ) response to data transmitted in a resource block including the UE-specific beamformed downlink CSI-RS. For example, a PUCCH can be used for transmission of the CSI report. Of course, the CSI report with respect to the UE-specific beamformed downlink CSI-RS is made by being triggered by a CSI request.

Further, a target of report may be a cell-specific beamformed CSI-RS. In this case, the terminal apparatus 200 transmits a CSI report a predetermined number of subframes after a CSI request by being triggered by reception of the CSI request from the base station 100. For example, uplink control information (UCI) can be used for transmission of the CSI report.

The above-described predetermined number of subframes may be, for example, four subframes or an arbitrary number of subframes.

The CSI report includes channel quality indicators (CQI), precoding matrix indicators (PMI), precoding type indicators (PTI), rank indicators (RI), or the like.

(6) Allocation of Beams

The base station 100 allocates beams on the basis of the CSI report obtained from the terminal apparatus 200. Allocation of beams indicate designation of antenna ports, generation of a terminal-specific weighting matrix, or the like.

For example, the base station 100 allocates beams to be used for transmission of the UE-specific beamformed downlink CSI-RS on the basis of the CSI report regarding the cell-specific beamformed CSI-RS. By this means, the base station 100 can appropriately allocate beams to be used for transmission of the UE-specific beamformed downlink CSI-RS.

Further, the base station 100 reallocates beams to be used for transmission of the UE-specific beamformed downlink CSI-RS on the basis of the CSI report regarding the UE-specific beamformed downlink CSI-RS. By this means, the base station 100 can cause the beam to efficiently follow the moving terminal apparatus 200.

(7) Processing Flow

Processing flow in the present example will be described below with reference to FIG. 17 and FIG. 18.

Figure 17:
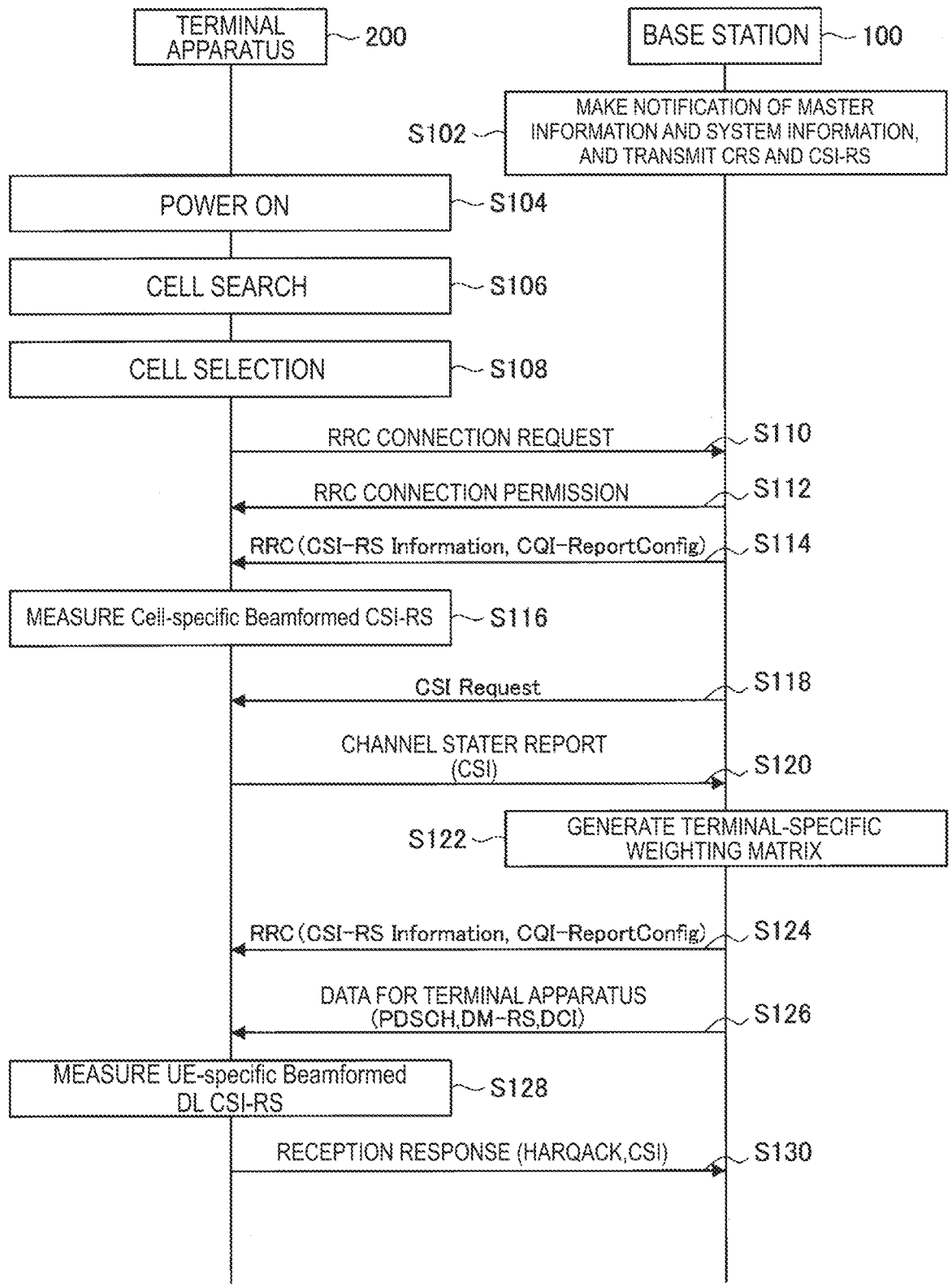
FIG. 17 is a sequence diagram illustrating an example of flow of communication processing executed in a system according to a first example.

FIG. 17 is a sequence diagram illustrating an example of flow of communication processing executed in the system 1 according to the present example. The base station 100 and the terminal apparatus 200 are involved in the present sequence.

As illustrated in FIG. 17, first, the base station 100 makes a notification of master information and system information and transmits a CRS and a CSI-RS (step S102). The CSI-RS transmitted here may be a cell-specific beamformed CSI-RS. Then, the terminal apparatus 200 is powered ON (step S104), and performs cell search (step S106) and cell selection (step S108). The terminal apparatus 200 then transmits an RRC connection request to the base station 100 (step S110), and the base station 100 transmits an RRC connection permission to the terminal apparatus 200 (step S112).

The base station 100 then transmits CSI-RS information and a CQI report configuration to the terminal apparatus 200 through RRC signaling (step S114). The terminal apparatus 200 then measures a cell-specific beamformed CSI-RS on the basis of the received CSI-RS information and CQI report configuration (step S116). When the base station 100 transmits a CSI request to the terminal apparatus 200 (step S118), the terminal apparatus 200 transmits a CSI report of the cell-specific beamformed CSI-RS to the base station 100 as a channel state report four subframes after the transmission (step S120).

The base station 100 then generates a terminal-specific weighting matrix for a beam to the terminal apparatus 200 on the basis of the received CSI report (step S122). The base station 100 then transmits CSI-RS information and a CQI report configuration to the terminal apparatus 200 through RRC signaling (step S124). The base station 100 then transmits a PDSCH, a DM-RS and DCI as data for the terminal apparatus 200 (step S126). This DCI may include information indicating a resource position of the UE-specific beamformed downlink CSI-RS multiplied by the terminal-specific weighting matrix by the base station 100, and the UE-specific beamformed downlink CSI-RS may be transmitted in the resource position. The terminal apparatus 200 then measures the UE-specific beamformed downlink CSI-RS (step S128). The terminal apparatus 200 then transmits a HARQ response and a CSI report to the base station 100 as a reception response (step S130). This reception response may be transmitted four subframes after the UE-specific beamformed downlink CSI-RS.

An example of the flow of the communication processing in the present example has been described above. Subsequently, another example of the flow of the communication processing in the present example will be described.

Figure 18:
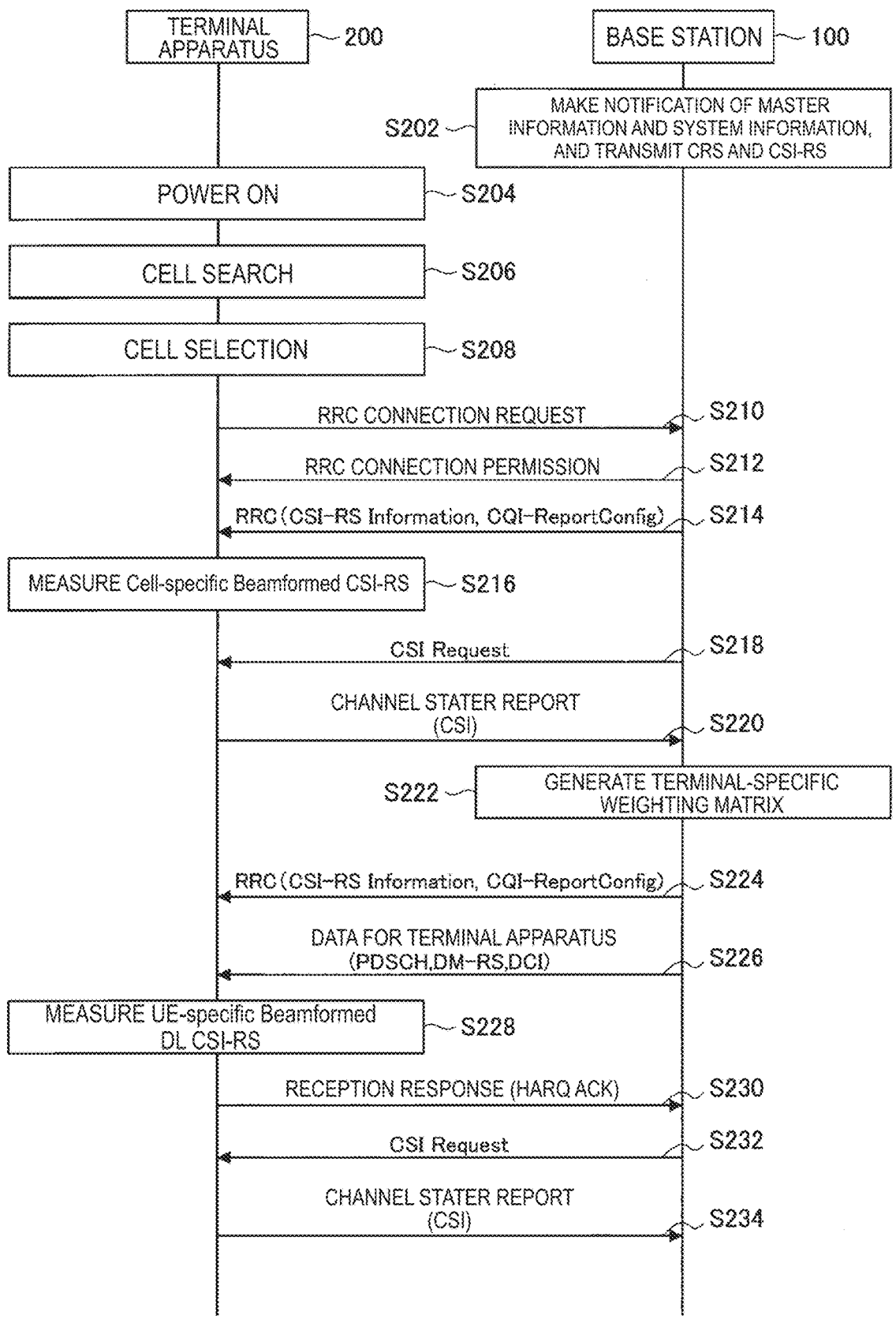
FIG. 18 is a sequence diagram illustrating an example of flow of communication processing executed in a system according to the first example.

FIG. 18 is a sequence diagram illustrating an example of the flow of the communication processing executed in the system 1 according to the present example. The base station 100 and the terminal apparatus 200 are involved in the present sequence. Further, because processing from step S202 to S228 in the present sequence are similar to the processing from step S102 to S128 in the sequence described with reference to FIG. 17, description will be omitted here.

After step S228, the terminal apparatus 200 transmits a HARQ response to the base station 100 as a reception response (step S230). When the base station 100 transmits a CSI request to the terminal apparatus 200 (step S232), the terminal apparatus 200 transmits a CSI report of the UE-specific beamformed downlink CSI-RS to the base station 100 as a channel state report four subframes after the transmission (step S234).

3.2. Second Example

The present example is an example in which a measurement result of the UE-specific beamformed downlink CSI- RS is reported as a channel state report in units of a sub-band. A difference with the first example will be mainly described below.

(1) Channel State Report in Units of Sub-Band

The terminal apparatus 200 transmits information indicating a measurement result in units of a radio resource as information indicating a measurement result in units of a sub-band. More specifically, the terminal apparatus 200 transmits information indicating a measurement result of the UE-specific beamformed downlink CSI-RS in units of a radio resource included in a sub-band as information indicating a measurement result in units of a sub-band. The information indicating a measurement result here may be a channel state report.

In the present example, a resource block including the UE-specific beamformed downlink CSI-RS, allocated from the base station 100 does not have to satisfy the number of resource blocks constituting one sub-band determined in accordance with a channel bandwidth. By this means, it becomes possible to make a report even if the UE-specific beamformed downlink CSI-RS is not measured over the entire sub-band, so that it becomes possible to reduce processing load.

(2) Notification of CSI Reporting Mode

The base station 100 notifies the terminal apparatus 200 of a CSI reporting mode.

In the present example, among the CSI reporting modes indicated in Table 6 above, the reporting modes 4-0, 4-1 and 4-2 may be newly added.

Cell-Specific Beamformed CSI-RS

For example, the base station 100 notifies the terminal apparatus 200 to which a beam of FD-MIMO is first allocated, of the reporting mode 4-0. Operation in this case is similar to that in the above-described first example.

UE-Specific Beamformed Downlink CSI-RS

For example, the base station 100 notifies the terminal apparatus 200 in an RRC connected state, to which a PDSCH beam of FD-MIMO has been once allocated, of, for example, the reporting mode 4-1. In the present example, in the case where the terminal apparatus 200 is notified of the reporting mode 4-1, the terminal apparatus 200 measures and reports the UE-specific beamformed downlink CSI-RS.

As indicated in Table 6 above, in the reporting mode 4-1, the reporting timing is aperiodic, the measurement target range is a sub-band (UE selected sub-band), PMI reporting is required, and the CSI-RS to be measured is a cell-specific beamformed CSI-RS. For example, in the reporting mode 4-1, in the case where a resource block including a UE-specific beamformed downlink CSI-RS is scheduled, the terminal apparatus 200 reports a recommended precoding matrix in a sub-band including the resource block, and a single CQI for each code word in the case where it is assumed that the recommended precoding matrix is used and transmission is performed using the same resource block. In the present example, the terminal apparatus 200 reports a position of the sub-band including this resource block.

Transmission Mode

In a similar manner to the above-described first example, the transmission modes 11 and 12 indicated in Table 7 above may be added.

The base station 100 notifies the terminal apparatus 200 in an RRC connected state, which supports FD-MIMO, of a downlink transmission mode through RRC signaling. For example, in the case where the terminal apparatus 200 is notified of the transmission mode 12 and the reporting mode 4-1 as the CSI reporting mode, the terminal apparatus 200 transmits a CSI report regarding the UE-specific beamformed downlink CSI-RS.

(3) Processing Flow

Because processing flow according to the present example is similar to that of the first example except for the notified CSI reporting mode and content of the CSI report in accordance with the CSI reporting mode, detailed description will be omitted here.

3.3. Third Example

The present example is an example in which conditions regarding reception strength of the UE-specific beamformed downlink CSI-RS are added to triggering conditions of a measurement report.

(1) Notification of Measurement Configuration

The base station 100 notifies the terminal apparatus 200 of a measurement configuration. A method according to the present example will be described below after an existing method is first described.

Existing Method

The eNB notifies UE which issues an RRC connection request of a measurement configuration through RRC signaling. The measurement configuration includes measurement objects, a triggering mechanism, reporting configurations, measurement identities, or the like. The measurement objects are information designating a measurement target. The triggering mechanism is information indicating whether a timing is event driven (A1 to A6) or periodic (expiry of a timer). The reporting configurations are information indicating designation of reference signal received power (RSRP) or reference signal received quality (RSRQ). The measurement identities are information which associate the measurement objects with the reporting configurations.

Method According to Present Example

The base station 100 notifies the terminal apparatus 200 which supports FD-MIMO of the measurement configuration. Particularly, the base station 100 designates RSRP of the UE-specific beamformed downlink CSI-RS (that is, CSI-RSRP) as a measurement target in the measurement configuration. The base station 100 then includes information regarding the UE-specific beamformed downlink CSI-RS in the CSI-RS information. Further, the base station 100 designates CSI-RP of the beamformed CSI-RS in addition to RSRP and RSRQ of a serving cell as the measurement target and designates an event driven triggering mechanism in the measurement configuration.

(2) Measurement and Report

The terminal apparatus 200 performs measurement in accordance with the measurement configuration and makes a report to the base station 100.

The terminal apparatus 200 which supports FD-MIMO determines a resource position of the UE-specific beamformed downlink CSI-RS from the notified CSI-RS information. The terminal apparatus 200 then measures reception strength of the determined resource position.

For example, the terminal apparatus 200 notifies the base station 100 of the measurement report under triggering conditions that CSI-RSRP of the UE-specific beamformed downlink CSI-RS becomes smaller than a predetermined threshold. The base station 100 can know that the UE-specific beamformed downlink CSI-RS allocated to the terminal apparatus 200 is not appropriate from the measurement report from the terminal apparatus 200. Therefore, the base station 100 can request a channel state report regarding the cell-specific beamformed CSI-RS to the terminal apparatus 200 and reconsider antenna ports of beams to be allocated or a weighting matrix.

As a trigger event of the measurement report, for example, existing six events can be used.
Event A1: Serving cell becomes better than a threshold
Event A2: Serving cell becomes worse than a threshold
Event A3: Neighbour cell becomes better than the serving cell by an offset
Event A4: Neighbour cell becomes better than a threshold
Event A5: Serving cell becomes worse than threshold 1 while neighboring cells becomes better than threshold 2
Event A6: Neighbour cell becomes better than a secondary cell by an offert The terminal apparatus 200 measures a measurement target and transmits a measurement report to the base station 100 in the case where the measurement result satisfies the triggering conditions. Examples of the measurement target can include measurement targets in related art such as RSRP and RSRQ of a CRS of a serving cell, and RSRP and RSRQ of a CRS of an adjacent cell. In the present example, further, CSI-RSRP of a CSI-RSRP designated in the CSI-RS information, and CSI-IM-RSRP of a CSI-RS transmitted by the adjacent cell may be added as the measurement target.

An example of interference control by the measurement report based on the event A2 in which the measurement target of the serving cell is CSI-RSRP of a UE-specific beamformed downlink CSI-RS will be described below as an example.

The event A2 is a trigger in the case where a measurement value of the serving cell becomes smaller than a predetermined threshold. Here, an entering condition A2-1 and a leaving condition A2-2 can be respectively expressed with the following equation (2) and equation (3).

[Math. 2]

$$Ms+Hys<Thresh \quad (2)$$

[Math. 3]

$$Ms-Hys>Thresh \quad (3)$$

Here, Ms is a measurement value of the serving cell, and, in the present example, is CSI-RSRP of the UE-specific beamformed downlink CSI-RS. Hys is a hysteresis of the present event. Thresh is a predetermined threshold of the present event. Ms indicates RSRP in units of dBM and indicates RSRQ in units of dB. Hys is indicated in units of dB. Thresh is indicated in the same units as units of Ms.

In this manner, in the case where CSI-RSRP of the UE-specific beamformed downlink CSI-RS of the serving cell becomes smaller than a predetermined threshold, the base station 100 is notified of the measurement report.

The measurement report notified from the terminal apparatus 200 to the base station 100 includes, for example, a measurement report ID, a CSI-RS configuration ID, or the like. Particularly, in the present embodiment, information indicating reception strength of the UE-specific beamformed downlink CSI-RS (for example, CSI-RSRP) is included in the measurement report as the measurement value of the serving cell.

The base station 100 can judge that the measurement report is triggered by the event A2 from the measurement report ID. Further, the base station 100 can know that the UE-specific beamformed downlink CSI-RS allocated to the terminal apparatus 200 by the base station 100 is no longer appropriate because CSI-RSRP of the UE-specific beamformed downlink CSI-RS is reported as the measurement value of the serving cell. Therefore, the base station 100 can request a channel state report regarding the cell-specific beamformed CSI-RS to the terminal apparatus 200 and efficiently reconsider the UE-specific beamformed downlink CSI-RS appropriate for the terminal apparatus 200.

The measurement report may include, for example, information indicating an antenna port number selected by the terminal apparatus 200. The information indicating the selected antenna port number may be expressed by a list of antenna port numbers or may be expressed with a bitmap corresponding to the antenna ports.

An example in the case where the report timing satisfies the triggering conditions has been described above. Further, the report timing may be a regular timing designated in the measurement configuration. Further, the report timing may be when allocation of beams is changed, or when the transmission mode transitions to a transmission mode 12 for FD-MIMO. Further, the report timing may be when a CQI report is requested.

The measurement result of the UE-specific beamformed downlink CSI-RS can be different depending on a position of a resource block to be scheduled. It is, therefore, for example, also possible to obtain an average of the CSI-RSRP of a plurality of UE-specific beamformed downlink CSI-RSs included in sub-bands and make a report for each sub-band.

(3) Processing Flow

Processing flow in the present example will be described below with reference to FIG. 19.

Figure 19:
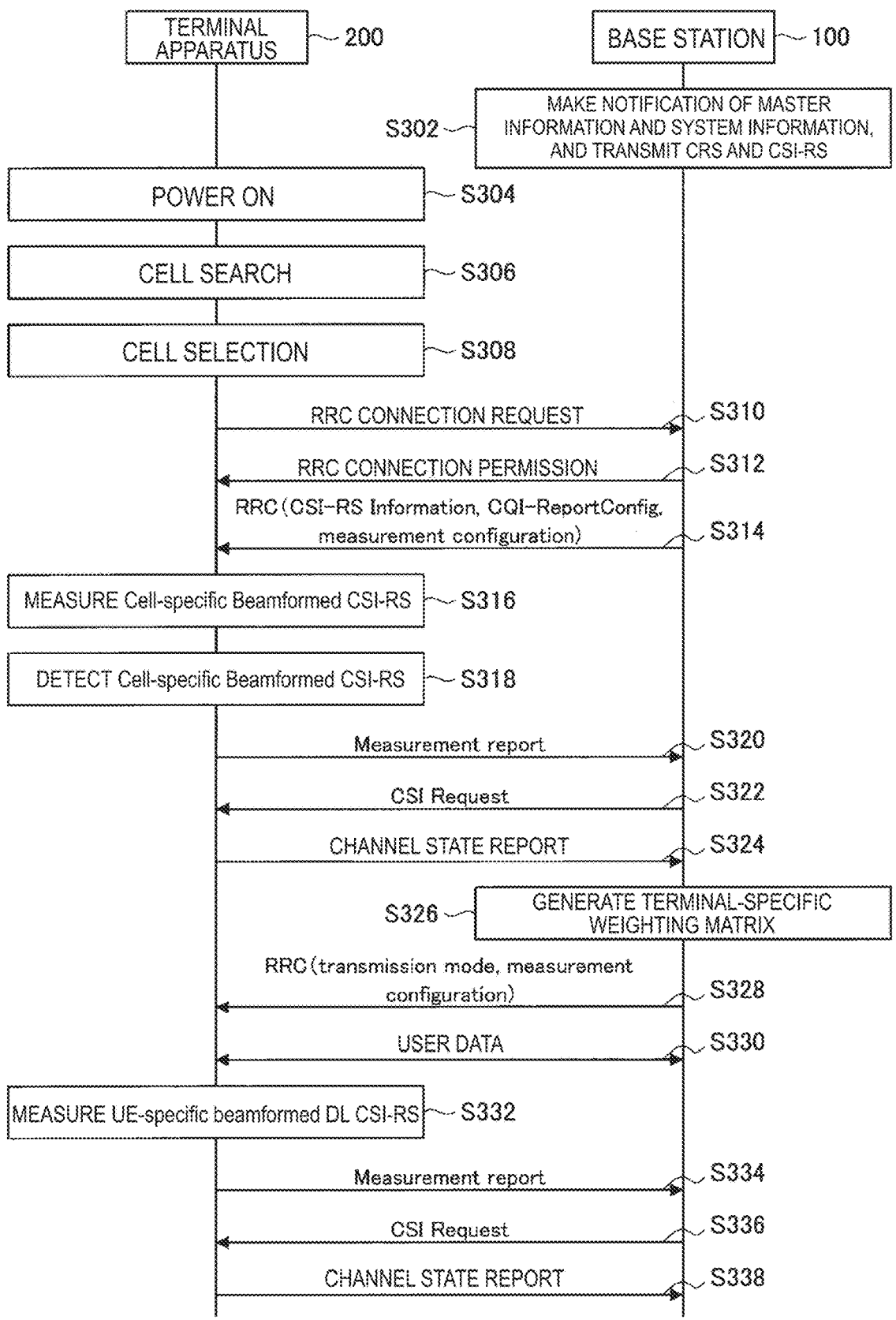
FIG. 19 is a sequence diagram illustrating an example of flow of communication processing executed in a system according to a third example.

FIG. 19 is a sequence diagram illustrating an example of flow of communication processing executed in the system 1 according to the present example. The base station 100 and the terminal apparatus 200 are involved in the present sequence.

As illustrated in FIG. 19, first, the base station 100 makes a notification of master information and system information and transmits a CRS and a CSI-RS (step S302). The CSI-RS transmitted here may be a cell-specific beamformed CSI-RS. Then, the terminal apparatus 200 is powered ON (step S304) and performs cell search (step S306) and cell selection (step S308). Then, the terminal apparatus 200 transmits an RRC connection request to the base station 100 (step S310), and the base station 100 transmits an RRC connection permission to the terminal apparatus 200 (step S312).

The base station 100 then transmits CSI-RS information, a CQI report configuration and a measurement configuration to the terminal apparatus 200 through RRC signaling (step S314). The terminal apparatus 200 then measures a cell-specific beamformed CSI-RS on the basis of the received CSI-RS information, CQI report configuration and measurement configuration (step S316). The terminal apparatus 200 then detects a cell-specific beamformed CSI-RS which fires a trigger event (step S318) and transmits a measurement report regarding the cell-specific beamformed CSI-RS to the base station 100 (step S320). Further, when the base station 100 transmits a CSI request to the terminal apparatus 200 (step S322), the terminal apparatus 200 transmits a CSI report of the cell-specific beamformed CSI-RS to the base station 100 as a channel state report four subframes after the transmission (step S324).

The base station 100 then generates a terminal-specific weighting matrix for beams to the terminal apparatus 200 on the basis of the received measurement report or CSI report (step S326). The base station 100 then transmits the transmission mode and the measurement configuration to the terminal apparatus 200 through RRC signaling (step S328). The base station 100 then transmits user data to the terminal apparatus 200 (step S330). In the present user data, DCI including the UE-specific beamformed downlink CSI-RS multiplied by the terminal-specific weighting matrix by the base station 100 and information indicating a resource position of the UE-specific beamformed downlink CSI-RS may be transmitted. The terminal apparatus 200 then measures the UE-specific beamformed downlink CSI-RS (step S332). The terminal apparatus 200 then transmits a measurement report regarding the UE-specific beamformed downlink CSI-RS to the base station 100 (step S334). Further, when the base station 100 transmits a CSI request to the terminal apparatus 200 (step S336), the terminal apparatus 200 transmits a CSI report of the UE-specific beamformed downlink CSI-RS to the base station 100 as a channel state report four subframes after the transmission (step S338).

4. SECOND EMBODIMENT

The present embodiment is an embodiment in which the terminal apparatus 200 transmits a UE-specific uplink CSI-RS.

(1) Outline

The base station 100 measures a terminal-specific reference signal (that is, a UE-specific uplink CSI-RS), transmitted in a radio resource allocated for each terminal apparatus 200, in units of a radio resource and transmits information indicating a measurement result. This information indicating the measurement result is used for transmission beamforming by the terminal apparatus 200. This information indicating the measurement result is, for example, a recommended value of a weighting matrix to be used by the terminal apparatus 200 for uplink transmission.

(2) Technical Features

It is, for example, assumed that an antenna array including antenna elements of 4×4 is mounted on the terminal apparatus 200. In this case, the terminal apparatus 200 can beamform and transmit uplink data using a weighting matrix.

The terminal apparatus 200 notifies the base station 100 of setting information regarding the UE-specific uplink CSI-RS using UE capability upon RRC connection. This setting information includes, for example, support of FD-MIMO, support of a UE-specific uplink CSI-RS, the number of antenna ports to be used for transmission of a UE-specific uplink CSI-RS, or the like.

The base station 100 allocates a radio resource for transmitting the UE-specific uplink CSI-RS to the terminal apparatus 200 in an RRC connected state. In the present example, this radio resource is uplink. An example of setting of an uplink resource including the UE-specific uplink CSI-RS will be described below with reference to FIG. 20.

Figure 20:
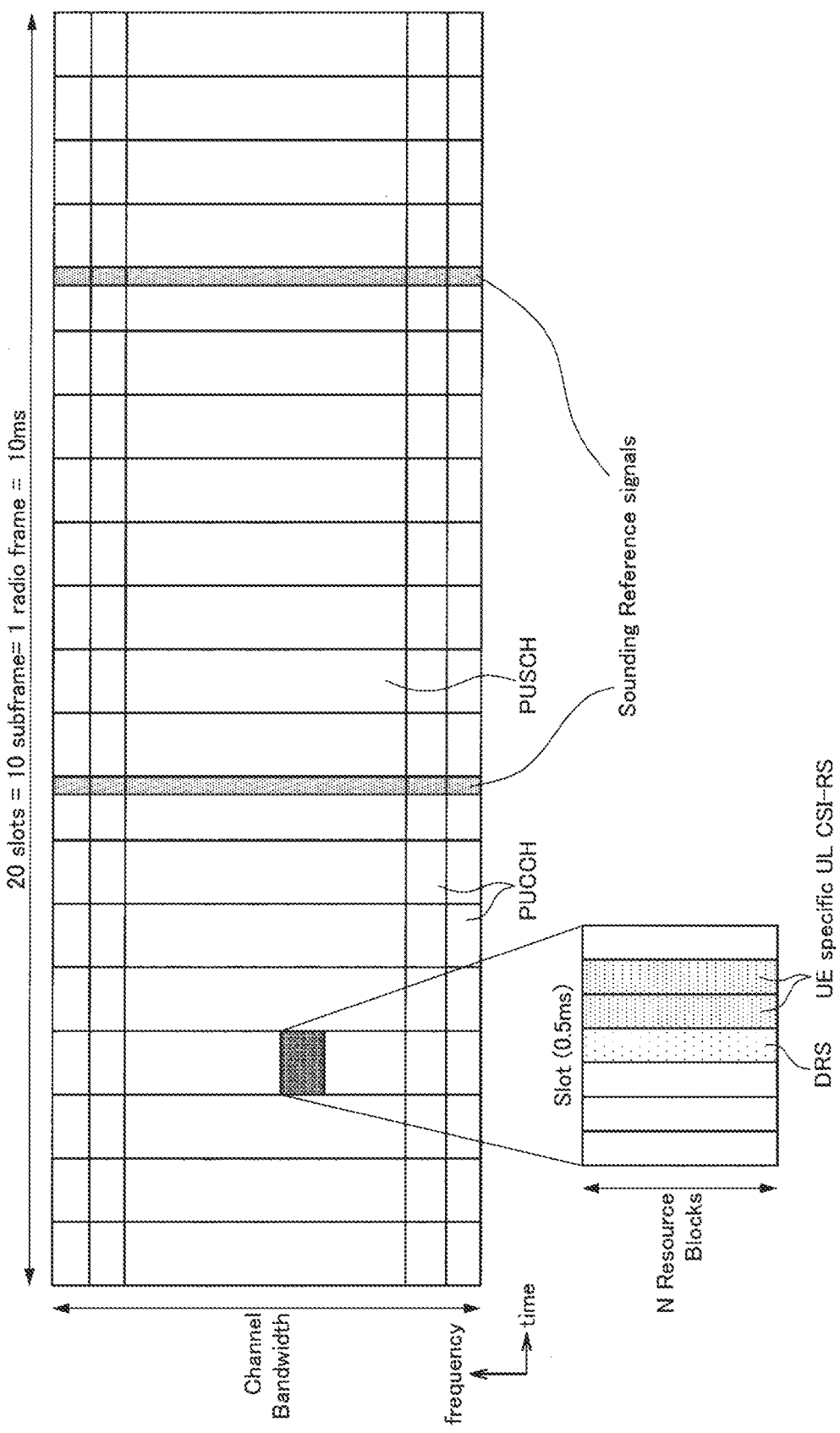
FIG. 20 is a diagram illustrating an example of resource setting according to a second embodiment.

FIG. 20 is a diagram illustrating an example of resource setting according to the present embodiment. As illustrated in FIG. 20, sounding reference signals (RS) are transmitted over the entire channel bandwidth. Further, the PUSCH and the PUCCH are transmitted using part of the channel bandwidth. As illustrated in FIG. 20, the UE-specific uplink CSI-RS is transmitted in a slot immediately after demodulation reference signals (DRS) in a resource block allocated for each terminal apparatus 200. In the case where the number of antenna ports of the terminal apparatus 200 is two, as illustrated in FIG. 20, two slots are allocated to the UE-specific uplink CSI-RS.

The base station 100 notifies the terminal apparatus 200 of information indicating an allocation result of a radio resource using DCI. Further, the base station 100 may transmit DCI including information requesting transmission of a UE-specific uplink CSI-RS. By this means, the base station 100 can cause the terminal apparatus 200 to transmit the UE-specific uplink CSI-RS.

The terminal apparatus 200 estimates an arrival direction of propagation by receiving a downlink signal using the antenna array. By this means, the terminal apparatus 200 can roughly predict a weighting matrix to be used upon transmission while there is a difference in a frequency between transmission and reception. For example, in the case where the number of antenna ports is two, the terminal apparatus 200 selects two types of weighting matrices corresponding to the two antenna ports. Note that the downlink signal to be used for estimation of an arrival report of propagation may be a cell-specific beamformed CSI-RS. Further, the weighting matrix may be selected at the base station 100.

The terminal apparatus 200 then transmits the UE-specific uplink CSI-RS beamformed with a plurality of types of weighting matrices in uplink using a resource block allocated to the terminal apparatus 200. Specifically, the terminal apparatus 200 transmits a UE-specific uplink CSI-RS at a symbol position determined in accordance with the number of antenna ports in an uplink resource allocated from the base station 100. The base station 100 then estimates a weighting matrix to be used by the terminal apparatus 200 for uplink transmission on the basis of a measurement result of the UE-specific uplink CSI-RS and makes a notification of a recommended value. By this means, the terminal apparatus 200 can beamform and transmit uplink data using the notified recommended value.

(3) Processing Flow

Flow of processing in the present embodiment will be described below with reference to FIG. 21.

Figure 21:
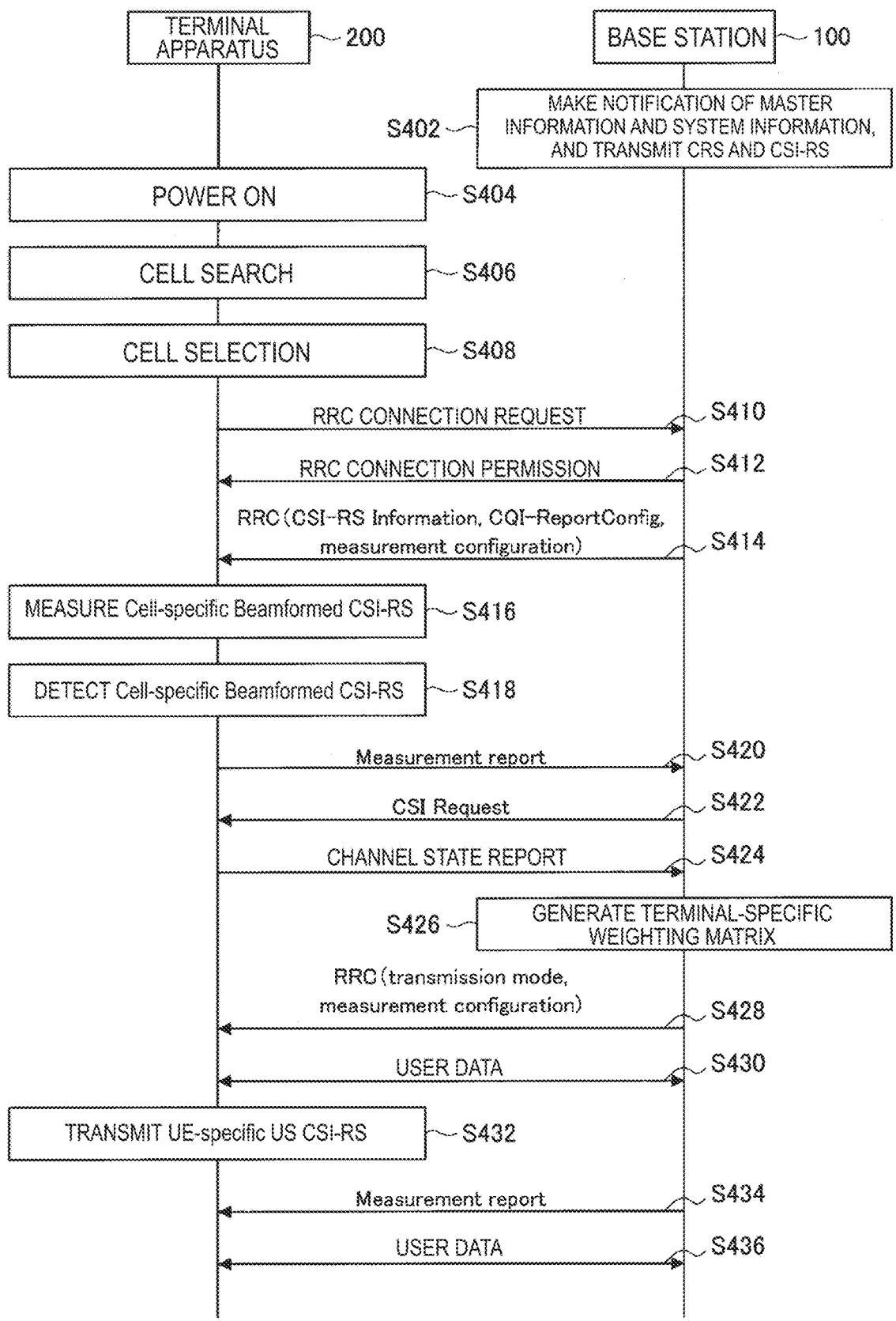
FIG. 21 is a sequence diagram illustrating an example of flow of communication processing executed in a system according to the second embodiment.

FIG. 21 is a sequence diagram illustrating an example of flow of communication processing executed in the system 1 according to the present embodiment. The base station 100 and the terminal apparatus 200 are involved in the present sequence.

As illustrated in FIG. 21, first, the base station 100 makes a notification of master information and system information and transmits a CRS and a CSI-RS (step S402). The CSI-RS transmitted here may be a cell-specific beamformed CSI-RS. The terminal apparatus 200 is then powered ON (step S404) and performs cell search (step S406) and cell selection (step S408). The terminal apparatus 200 then transmits an RRC connection request to the base station 100 (step S410), and the base station 100 transmits an RRC connection permission to the terminal apparatus 200 (step S412). The terminal apparatus 200 notifies the base station 100 of setting information regarding the UE-specific uplink CSI-RS using the UE capability upon this RRC connection.

The base station 100 then transmits CSI-RS information, a CQI report configuration and a measurement configuration to the terminal apparatus 200 through RRC signaling (step S414). The terminal apparatus 200 then measures a cell-specific beamformed CSI-RS on the basis of the received CSI-RS information, CQI report configuration and measurement configuration (step S416). The terminal apparatus 200 then detects a cell-specific beamformed CSI-RS which fires a trigger event (step S418) and transmits a measurement report regarding the cell-specific beamformed CSI-RS to the base station 100 (step S420). Further, when the base station 100 transmits a CSI request to the terminal apparatus 200 (step S422), the terminal apparatus 200 transmits a CSI report of the cell-specific beamformed CSI-RS to the base station 100 as a channel state report four subframes after the transmission (step S424).

The base station 100 then generates a terminal-specific weighting matrix for beams to be transmitted by the terminal apparatus 200 on the basis of the received measurement report and CSI report (step S426). The base station 100 then transmits a transmission mode and a measurement configuration to the terminal apparatus 200 through RRC signaling (step S428). The base station 100 and the terminal apparatus 200 then transmits/receives user data (step S430). In this event, the terminal-specific weighting matrix generated by the base station 100 may be transmitted from the base station 100 to the terminal apparatus 200. The terminal apparatus 200 then transmits a UE-specific uplink CSI-RS multiplied by the terminal-specific weighting matrix generated by the base station 100 (step S432). The base station 100 then measures the UE-specific uplink CSI-RS and transmits a measurement report to the terminal apparatus 200 (step S434). The base station 100 and the terminal apparatus 200 then transmits/receives user data (step S436).

5. APPLICATION EXAMPLES

The technology according to the present disclosure is applicable to various products. The base station 100 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of structural elements of the base station 100 may be realized in a base station apparatus or a module for a base station apparatus.

Further, the terminal apparatus 200 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 200 may be implemented as a machine type communication (MTC) terminal for establishing a machine to machine (M2M) communication. Furthermore, at least some of structural elements of the terminal apparatus 200 may be implemented as a module (e.g., integrated circuit module including a single die) that is mounted on these terminals.

5.1. Application Examples for Base Station

First Application Example

Figure 22:
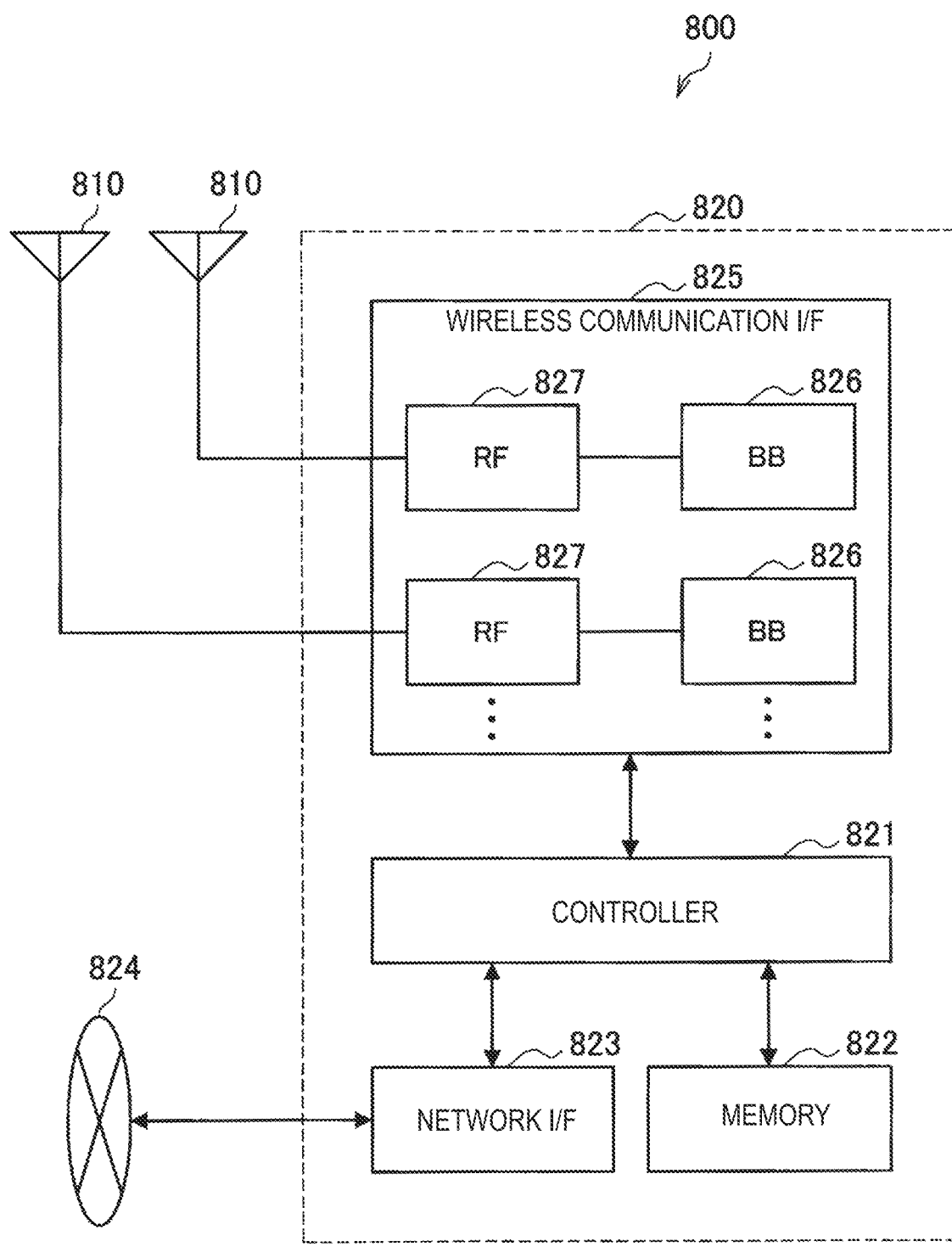
FIG. 22 is a block diagram illustrating a first example of a schematic configuration of an eNB.

FIG. 22 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 22, and the plurality of antennas 810 may, for example, correspond to a plurality of frequency bands used by the eNB 800. It should be noted that while FIG. 22 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of baseband processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a baseband (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 22, and the plurality of BB processors 826 may, for example, correspond to a plurality of frequency bands used by the eNB 800. Further, the wireless communication interface 825 may also include a plurality of the RF circuits 827, as illustrated in FIG. 22, and the plurality of RF circuits 827 may, for example, correspond to a plurality of antenna elements. Note that FIG. 22 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 22, one or more structural elements included in the base station 100 (the control unit 150, for example) described with reference to FIG. 12 may be implemented by the wireless communication interface 825. Alternatively, at least some of these structural elements may be implemented by the controller 821. As an example, a module which includes a part (for example, the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the wireless communication interface 825 (for example, the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 22, the wireless communication unit 120 described with reference to FIG. 12 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 23:
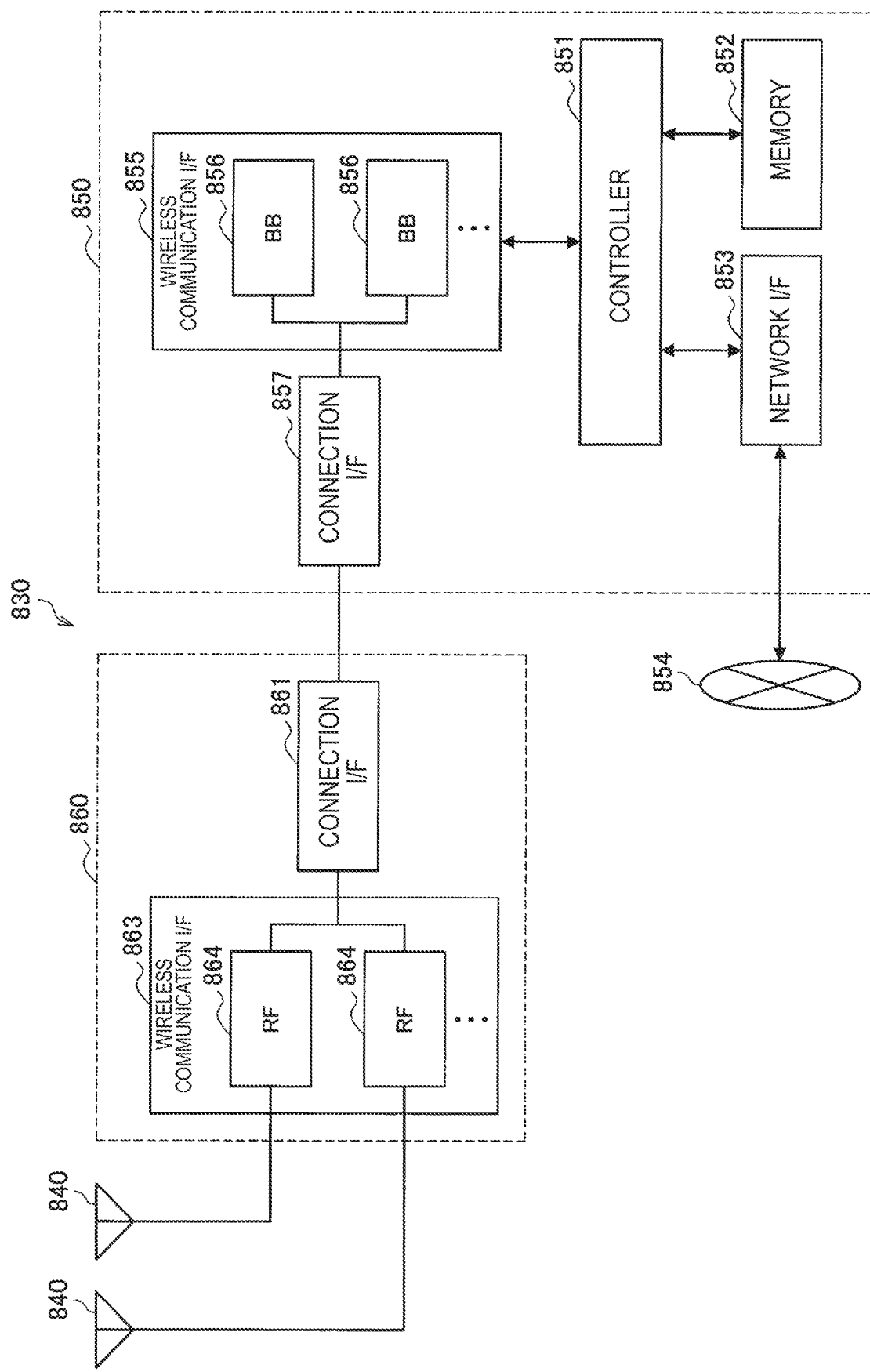
FIG. 23 is a block diagram illustrating a second example of a schematic configuration of an eNB.

FIG. 23 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 23, and the plurality of antennas 840 may, for example, correspond to a plurality of frequency bands used by the eNB 830. Note that FIG. 23 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 22 except that the BB processor 856 is connected to an RF circuit 864 of the RRH 860 via the connection interface 857. The wireless communication interface 855 may include a plurality of the BB processors 856, as illustrated in FIG. 23, and the plurality of BB processors 856 may, for example, correspond to a plurality of frequency bands used by the eNB 830. Note that FIG. 23 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 23, and the plurality of RF circuits 864 may, for example, correspond to a plurality of antenna elements. Note that FIG. 23 illustrates an example in which the wireless communication interface 863 includes the plurality of RF circuits 864, but the wireless communication interface 863 may include the single RF circuit 864.

In the eNB 830 illustrated in FIG. 23, one or more structural elements included in the base station 100 (the control unit 150, for example) described with reference to FIG. 12 may be implemented by the wireless communication interface 855 and/or the wireless communication interface 863. Alternatively, at least some of these structural elements may be implemented by the controller 851. As an example, a module which includes a part (for example, the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (for example, the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 23, for example, the wireless communication unit 120 described with reference to FIG. 12 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

5.2. Application Examples for Terminal Apparatus

First Application Example

Figure 24:
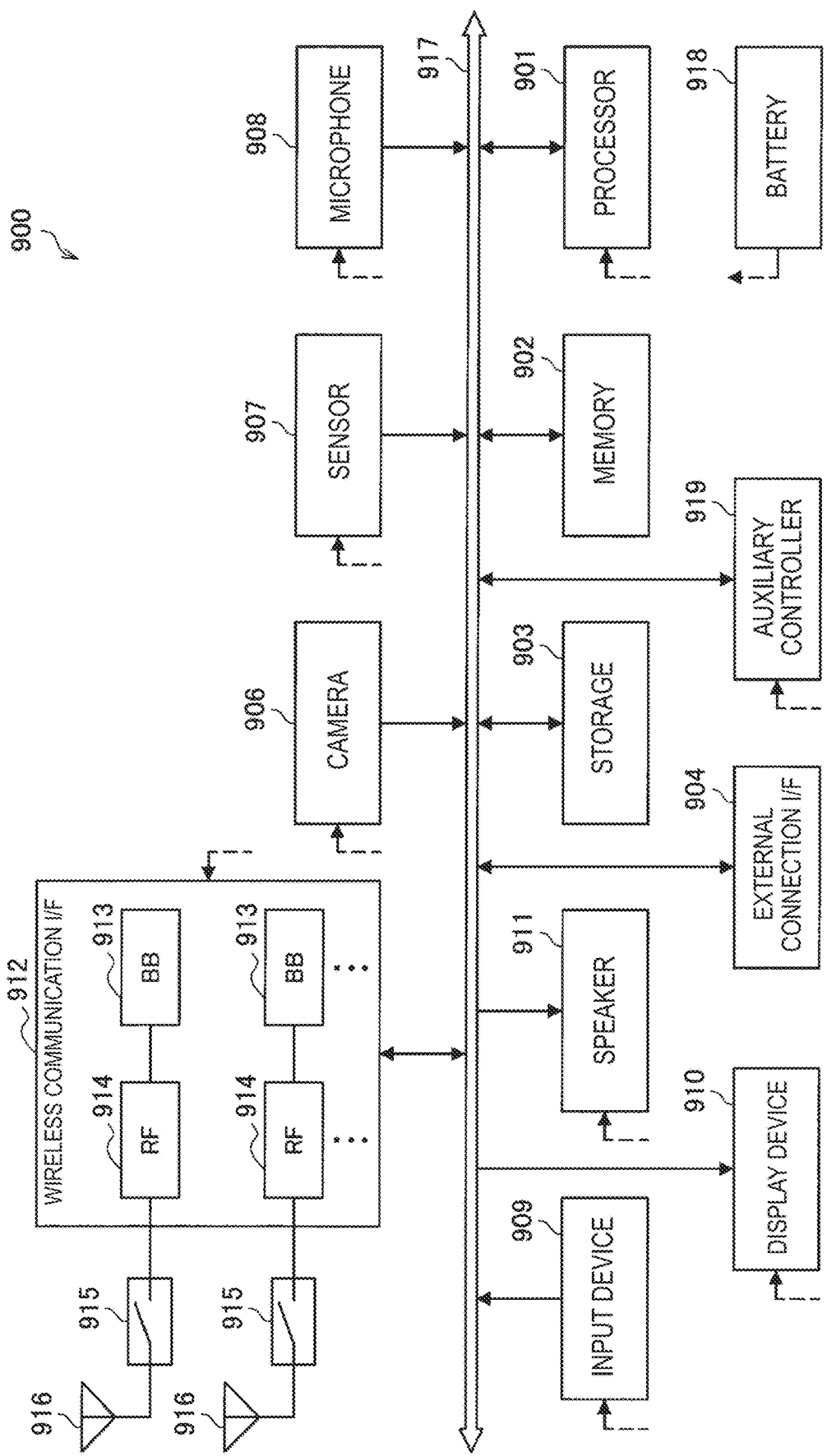
FIG. 24 is a block diagram illustrating an example of a schematic configuration of a smartphone.

FIG. 24 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 24. Note that FIG. 24 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 24. Note that FIG. 24 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 24 via a feeder line that is partially illustrated in the figure as a dashed line. The auxiliary controller 919, for example, operates a minimally necessary function of the smartphone 900 in a sleep mode.

In the smartphone 900 illustrated in FIG. 24, one or more structural elements included in the terminal apparatus 200 (the control unit 240, for example) described with reference to FIG. 13 may be implemented by the wireless communication interface 912. Alternatively, at least some of these structural elements may be implemented by the processor 901 or the auxiliary controller 919. As an example, a module which includes a part (for example, the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (for example, the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 24, for example, the wireless communication unit 220 described with reference to FIG. 13 may be implemented by the wireless communication interface 912 (for example, the RF circuit 914). Moreover, the antenna unit 210 may be implemented by the antenna 916. Further, the storage unit 230 may be implemented by the memory 902.

Second Application Example

FIG. 25 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 25. Note that FIG. 25 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 25. Note that FIG. 25 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 25 via a feeder line that is partially illustrated in the figure as a dashed line. Further, the battery 938 accumulates the electric power supplied from the vehicle.

In the car navigation apparatus 920 illustrated in FIG. 25, one or more structural elements included in the terminal apparatus 200 (the control unit 240, for example) described with reference to FIG. 13 may be implemented by the wireless communication interface 933. Alternatively, at least some of these structural elements may be implemented by the processor 921. As an example, a module which includes a part (for example, the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (for example, the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 25, for example, the wireless communication unit 220 described with reference to FIG. 13 may be implemented by the wireless communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes the control unit 240. The vehicle module 942 generates vehicle data such as vehicle speed, engine speed, and trouble information, and outputs the generated data to the in-vehicle network 941.

6. CONCLUSION

An embodiment of the present disclosure has been described in detail above with reference to FIG. 1 to FIG. 25. As described above, the terminal apparatus 200 according to the present embodiment measures a terminal-specific reference signal transmitted in a radio resource allocated for each terminal apparatus 200 in units of a radio resource and transmits information indicating a measurement result. Because a UE-specific beamformed downlink CSI-RS is transmitted in a radio resource for each terminal apparatus 200, it becomes possible to avoid a problem of overhead which occurs in the case where a beamformed cell-specific beamformed CSI-RS is frequently transmitted. Therefore, the base station 100 can continue to efficiently provide beams of FD-MIMO to the terminal apparatus 200 even if the terminal apparatus 200 moves at high speed. Further, in the case where the terminal apparatus 200 measures a terminal-specific reference signal, the terminal apparatus 200 can continue to efficiently provide beams of FD-MIMO to the base station 100 even if the terminal apparatus 200 moves at high speed. In this manner, the above-described first problem is solved.

Concerning the second problem, in the above-described second example, the terminal apparatus 200 transmits information indicating a measurement result in units of a radio resource as information indicating a measurement result in units of a sub-band. By this means, for example, even if a resource block including the UE-specific beamformed downlink CSI-RS does not satisfy the number of resource blocks constituting a sub-band, it becomes possible to report information indicating a measurement result in units of a sub-band. In this manner, the second problem is solved.

Concerning the third problem, in the above-described first example, the UE-specific beamformed downlink CSI-RS is transmitted on the basis of a measurement report of the UE-specific beamformed downlink CSI-RS or a cell-specific beamformed CSI-RS. By this means, it becomes possible to appropriately reallocate beams. In this manner, the third problem is solved.

Concerning the fourth problem, in the above-described second embodiment, the UE-specific uplink CSI-RS is transmitted from the terminal apparatus 200. By this means, it become possible to perform feedback from the base station 100. In this manner, the fourth problem is solved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

It is, for example, possible to combine the technologies described in the respective embodiments and the respective examples as appropriate. For example, in the second embodiment, as in the third example, the measurement report from the base station 100 may include information indicating reception strength of the UE-specific uplink CSI-RS.

Further, the processes described using the flowcharts and the sequence diagram in this specification need not be necessarily executed in the described order. Several process steps may be executed in parallel. Further, an additional process step may be employed, and some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication apparatus including:

a control unit configured to measure a terminal-specific reference signal transmitted in a radio resource allocated for each terminal apparatus in units of the radio resource and transmits information indicating a measurement result.

(2)
The communication apparatus according to (1),
in which the information indicating the measurement result is used for transmission beamforming.

(3)
The communication apparatus according to (1) or (2),
in which the control unit transmits the information indicating the measurement result in units of the radio resource as information indicating the measurement result in units of a sub-band.

(4)
The communication apparatus according to (3),
in which the control unit transmits the information indicating the measurement result in units of the radio resource included in the sub-band as the information indicating the measurement result in units of the sub-band.

(5)
The communication apparatus according to any one of (1) to (4),
in which information indicating reception strength of the reference signal is included in a measurement report.

(6)
The communication apparatus according to any one of (1) to (5),
in which the communication apparatus is a terminal apparatus.

(7)
The communication apparatus according to (6),
in which the information indicating the measurement result is a channel state report.

(8)
The communication apparatus according to (7),
in which the control unit transmits the channel state report using a physical uplink control channel.

(9)
The communication apparatus according to (7) or (8),
in which the control unit transmits the channel state report along with a hybrid automatic repeat-request (HARQ) response to data transmitted in the radio resource including the reference signal.

(10)
The communication apparatus according to any one of (1) to (5),
in which the communication apparatus is a base station.

(11)
The communication apparatus according to (10),
in which information indicating a measurement result is a recommended value of a weighting matrix to be used for uplink transmission.

(12)
A communication apparatus including:
a control unit configured to transmit information indicating an operation mode for causing a terminal apparatus to measure a terminal-specific reference signal transmitted in a radio resource allocated for each terminal apparatus in units of the radio resource and transmit information indicating a measurement result.

(13)
The communication apparatus according to (12),
in which the control unit allocates the radio resource for transmitting the reference signal, to the terminal apparatus in an RRC connected state.

(14)
The communication apparatus according to (12) or (13),
in which the information indicating the operation mode includes a CSI reporting mode.

(15)
The communication apparatus according to any one of (12) to (14),
in which the information indicating the operation mode includes a transmission mode.

(16)
The communication apparatus according to any one of (12) to (15),
in which the radio resource is downlink.

(17)
The communication apparatus according to (16),
in which the control unit transmits downlink control information including information indicating transmission of the reference signal.

(18)
The communication apparatus according to (16) or (17),
in which the control unit transmits downlink control information including a number of antenna ports used for transmission of the reference signal.

(19)
The communication apparatus according to any one of (16) to (18),
in which the control unit transmits configuration information of the reference signal.

(20)
The communication apparatus according to any one of (12) to (15),
in which the radio resource is uplink.

(21)
The communication apparatus according to (20),
in which the control unit transmits downlink control information including information requesting transmission of the reference signal.

(22)
The communication apparatus according to (20) or (21),
in which the reference signal is transmitted in uplink by the terminal apparatus.

(23)
The communication apparatus according to any one of (20) to (22),
in which a number of antenna ports used for transmission of the reference signal is included in capability information and transmitted from the terminal apparatus.

(24)
A communication method including:
measuring a terminal-specific reference signal transmitted in a radio resource allocated for each terminal apparatus in units of the radio resource and transmitting information indicating a measurement result by a processor.

(25)
A communication method including:
transmitting, by a processor, information indicating an operation mode for causing a terminal apparatus to measure a terminal-specific reference signal transmitted in a radio resource allocated for each terminal apparatus in units of the radio resource and transmit information indicating a measurement result.

(26)
A program for causing a computer to function as:
a control unit configured to measure a terminal-specific reference signal transmitted in a radio resource allocated for each terminal apparatus in units of the radio resource and transmit information indicating a measurement result.

(27)

A program for causing a computer to function as:
a control unit configured to transmit information indicating an operation mode for causing a terminal apparatus to measure a terminal-specific reference signal transmitted in a radio resource allocated for each terminal apparatus in units of the radio resource and transmit information indicating a measurement result.

Reference Signs List 1 system
100 base station
110 antenna unit
120 wireless communication unit
130 network communication unit
140 storage unit
150 control unit
200 terminal apparatus
210 antenna unit
220 wireless communication unit
230 storage unit
240 control unit
300 relay apparatus

The invention claimed is:

1. A communication apparatus comprising:
a controller configured to measure a terminal-specific reference signal transmitted in a radio resource allocated for another communication apparatus in units of the radio resource, and transmit information indicating a measurement result of the terminal-specific reference signal,
wherein the controller transmits the information indicating the measurement result in units of the radio resource as information indicating the measurement result in units of a sub-band,
wherein the information indicating the measurement result is a channel state report, and
wherein the controller is configured to transmit the channel state report along with a hybrid automatic repeat-request (HARQ) response to received data.

2. The communication apparatus according to claim 1, wherein the information indicating the measurement result is used for transmission beamforming.

3. The communication apparatus according to claim 1, wherein the controller transmits the information indicating the measurement result in units of the radio resource included in the sub-band as the information indicating the measurement result in units of the sub-band.

4. The communication apparatus according to claim 1, wherein information indicating reception strength of the reference signal is included in a measurement report.

5. The communication apparatus according to claim 1, wherein the communication apparatus is a terminal apparatus.

6. The communication apparatus according to claim 1, wherein the controller transmits the channel state report using a physical uplink control channel.

7. The communication apparatus according to claim 1, wherein the communication apparatus is a base station.

8. The communication apparatus according to claim 7, wherein the information indicating the measurement result is a recommended value of a weighting matrix to be used for uplink transmission.

9. A communication apparatus comprising:
a controller configured to transmit information indicating an operation mode for causing another communication apparatus to measure a terminal-specific reference signal transmitted in a radio resource allocated for a communication apparatus in units of the radio resource, and transmit information indicating a measurement result of the terminal-specific reference signal,
wherein the measurement result is transmitted in units of the radio resource as information indicating the measurement result in units of a sub-band,
wherein the information indicating the measurement result is a channel state report, and
wherein the controller is configured to transmit the channel state report along with a hybrid automatic repeat-request (HARQ) response to received data.

10. The communication apparatus according to claim 9, wherein the controller allocates the radio resource for transmitting the reference signal, to the other communication apparatus in a radio resource control (RRC) connected state.

11. The communication apparatus according to claim 9, wherein the information indicating the operation mode includes a channel state information (CSI) reporting mode.

12. The communication apparatus according to claim 9, wherein the information indicating the operation mode includes a transmission mode.

13. The communication apparatus according to claim 9, wherein the radio resource is downlink.

14. The communication apparatus according to claim 13, wherein the controller transmits downlink control information including information indicating transmission of the reference signal.

15. The communication apparatus according to claim 13, wherein the controller transmits downlink control information including a number of antenna ports used for transmission of the reference signal.

16. Tire communication apparatus according to claim 13, wherein the controller transmits configuration information of the reference signal.

17. The communication apparatus according to claim 9, wherein the radio resource is uplink.

18. The communication apparatus according to claim 17, wherein the controller transmits downlink control information including information requesting transmission of the reference signal.

19. The communication apparatus according to claim 17, wherein the reference signal is transmitted in uplink by the other communication apparatus.

20. The communication apparatus according to claim 17, wherein a number of antenna ports used for transmission of the reference signal is included in capability information and transmitted from the other communication apparatus.

21. A communication method comprising:
measuring a terminal-specific reference signal transmitted in a radio resource allocated for another communication apparatus in units of the radio resource;
transmitting information indicating a measurement result of the terminal-specific reference signal by a processor,
wherein the measurement result is transmitted in units of the radio resource as information indicating the measurement result in units of a sub-band, and
wherein the information indicating the measurement result is a channel state report; and transmitting the channel state report along with a hybrid automatic repeat-request (HARQ) response to received data.

22. A communication method comprising:
transmitting, by a processor, information indicating an operation mode for causing a communication apparatus to measure a terminal-specific reference signal transmitted in a radio resource allocated for another communication apparatus in units of the radio resource;
transmitting information indicating a measurement result of the terminal-specific reference signal,
wherein the measurement result is transmitted in units of the radio resource as information indicating the measurement result in units of a sub-band, and
wherein the information indicating the measurement result is a channel state report; and
transmitting the channel state report along with a hybrid automatic repeat-request (HARQ) response to received data.

23. A non-transitory computer-readable storage medium storing instructions thereon, which when executed by processing circuitry, cause the processing circuitry to execute a method, the method comprising:
measuring a terminal-specific reference signal transmitted in a radio resource allocated for a communication apparatus in units of the radio resource, and transmitting information indicating a measurement result of the terminal-specific reference signal,
wherein the measurement result is transmitted in units of the radio resource as information indicating the measurement result in units of a sub-band, and
wherein the information indicating the measurement result is a channel state report; and
transmitting the channel state report along with a hybrid automatic repeat-request (HARQ) response to received data.

24. A non-transitory computer-readable storage medium storing instructions thereon, which when executed by processing circuitry, cause the processing circuitry to execute a method, the method comprising:
transmitting information indicating an operation mode for causing a communication apparatus to measure a terminal-specific reference signal transmitted in a radio resource allocated for another communication apparatus in units of the radio resource;
transmitting information indicating a measurement result of the terminal-specific reference signal,
wherein the measurement result is transmitted in units of the radio resource as information indicating the measurement result in units of a sub-band, and
wherein the information indicating the measurement result is a channel state report; and
transmitting the channel state report along with a hybrid automatic repeat-request (HARQ) response to received data.

* * * * *